(12) United States Patent
Goodman et al.

(10) Patent No.: US 7,818,100 B2
(45) Date of Patent: Oct. 19, 2010

(54) SYSTEM AND METHOD FOR OPTIMIZED RUNWAY EXITING

(75) Inventors: William L. Goodman, Coupeville, WA (US); Thomas Imrich, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 559 days.

(21) Appl. No.: 11/777,351

(22) Filed: Jul. 13, 2007

(65) Prior Publication Data

US 2008/0249675 A1  Oct. 9, 2008

Related U.S. Application Data

(60) Provisional application No. 60/909,935, filed on Apr. 3, 2007.

(51) Int. Cl.
B64C 13/16 (2006.01)
G05D 1/00 (2006.01)
G05D 13/00 (2006.01)

(52) U.S. Cl. .................. 701/16; 244/111; 244/183; 701/15; 340/959

(58) Field of Classification Search .............. 701/16
See application file for complete search history.

(56) References Cited

U.S. PATENT DOCUMENTS

| 5,968,106 | A * | 10/1999 | DeVlieg et al. ............... 701/70 |
| 6,112,141 | A * | 8/2000 | Briffe et al. .................. 701/14 |
| 7,014,146 | B2 * | 3/2006 | Villaume et al. ............ 244/111 |
| 2002/0077743 | A1 * | 6/2002 | Schmidt ..................... 701/120 |
| 2003/0009278 | A1 * | 1/2003 | Mallet et al. ................ 701/120 |
| 2005/0006524 | A1 * | 1/2005 | Villaume et al. ............ 244/111 |
| 2006/0038068 | A1 * | 2/2006 | Sullivan ..................... 244/111 |
| 2006/0271250 | A1 * | 11/2006 | Dubeck et al. ............... 701/16 |
| 2007/0021878 | A1 * | 1/2007 | Builta et al. .................. 701/7 |
| 2007/0208466 | A1 * | 9/2007 | Meunier ...................... 701/16 |
| 2008/0179452 | A1 * | 7/2008 | Kinkopf et al. .............. 244/24 |

FOREIGN PATENT DOCUMENTS

WO PCT/US 2008/056877  3/2008

OTHER PUBLICATIONS (NASA-CR-195026) Guidance and Control Requirements for High-Speed Rollout and Turnoff (ROTO) Final Report (McDonnell-Douglas Aerospace) 127 p Nasa Contractor Report 195026, Contract NAS1-19703 Task 3, Jan. 1995, National Aeronautics and Space Adminstration Langley Research Center, Hampton, VA 23681-0001.

* cited by examiner

Primary Examiner—Khoi Tran
Assistant Examiner—Kyung J Kim
(74) Attorney, Agent, or Firm—Tung & Associates

(57) ABSTRACT

Methods and apparatus are provided for optimizing runway exiting. Prior to landing, the pilot may choose to input one or more new landing parameters. Then, based on current landing parameters (e.g., any new landing parameter(s) and remaining default landing parameters) and the aircraft performance parameters, predicted landing performance can be updated and indicia of the updated predicted landing performance can be displayed to the pilot on an updated airport map and display. The updated predicted landing performance can include, among other things, a display of AUTOBRAKE landing performance. When no further changes to the current landing parameters are desired, the automatic braking system can be set to provide dynamic braking to slow the aircraft to a selected velocity at a selected position on a particular runway.

24 Claims, 19 Drawing Sheets

SYSTEM AND METHOD FOR OPTIMIZED RUNWAY EXITING

CROSS-REFERENCES TO RELATED APPLICATIONS

This application claims the benefit of U.S. Provisional Application No. 60/909,935, filed Apr. 3, 2007 which is incorporated by reference herein in its entirety.

TECHNICAL FIELD

The embodiments described herein generally relate to aircraft braking techniques and technologies for landing an aircraft, and more particularly relates to an aircraft automatic braking system, and methods for providing optimized runway exiting and for landing of an aircraft at a selected point or selected exit taxiway (ET) on a particular landing runway.

BACKGROUND

Early aircraft AUTOBRAKE systems controlled airplane deceleration to one of several predetermined aircraft deceleration settings. Thus, if a pilot wished to stop the airplane at a certain point on the runway, for example at a runway exit, it is unlikely that the AUTOBRAKE system would provide a deceleration setting that matched the stopping distance to the selected runway stop point. The pilot's choice, then, was to select one of the deceleration settings, and, if the airplane was decelerating too quickly, the pilot can select another AUTOBRAKE setting or disarm the AUTOBRAKE system and use pedal braking to avoid stopping short of the desired point. If, however, the airplane was decelerating too slowly, the pilot would again need to revert to a different AUTOBRAKE setting or to pedal braking to increase deceleration to stop the airplane at the selected stopping point. Both of the above conditions resulted in uneven deceleration that is apparent to the airplane passengers.

Aircraft AUTOBRAKING systems have been developed which apply predetermined braking to an aircraft. These AUTOBRAKING systems typically provide four or five selectable deceleration rates which can be used to decelerate the landing aircraft at the deceleration rate selected by the pilot. The result being either the braking of the aircraft at a specific rate until stopped or the pilot taking command of braking before the aircraft stops.

Modern aircraft can have the ability to determine position on the runway, calculate the deceleration rate for a specific exit taxiway on that runway, and automatically modulate the application of the brakes so as to arrive at the exit taxiway at a speed slow enough as to exit at the predefined exit taxiway.

SUMMARY

Methods and apparatus are provided for optimizing runway exiting. In one implementation, a system is provided which can allow a pilot to exit a landing runway at a selected position on a particular runway by controlling activation of an automatic braking system of the aircraft so that the aircraft reaches a specified velocity at the selected position on the particular runway. The system includes one or more display units which display default landing parameters and aircraft landing performance parameters. The system also includes a computer programmed to determine predicted landing performance based on the default landing parameters and the aircraft landing performance parameters. A display unit displays an airport map which includes the default landing runway having a number of exit taxiways. Indicia of the predicted landing performance are also displayed on the airport map at locations along the default runway. The indicia of predicted landing performance displayed on the airport map can include one or more of: a Runway Exit Indicator (REI), a Runway Exit Target (RET), and a static when airborne/dynamic upon landing Landing Performance Indicator (LPI). During flight, the pilot can use an input device to input any new landing parameters prior to landing. The computer computes updated current landing parameters each time one or more of the landing parameters are changed, and also determines updated predicted landing performance based these landing parameters and the aircraft performance parameters. An updated airport map is then displayed which displays the currently selected runway (this can be the default runway if the pilot did not input a new runway when entering updated landing parameters). In addition, updated predicted landing performance can be displayed on the currently selected runway for at least one exit taxiway. The updated landing performance which is displayed on the updated airport map can include one or more of: an updated Runway Exit Indicator (REI), an updated Runway Exit Target (RET), an updated Brake Activation Target (BAT) and a Landing Performance Indicator (LPI) which is static when airborne or dynamic upon landing, and can also include a recommended setting for the automatic braking system that will provide dynamic braking to slow the aircraft to the specified velocity at the selected position on the particular runway.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
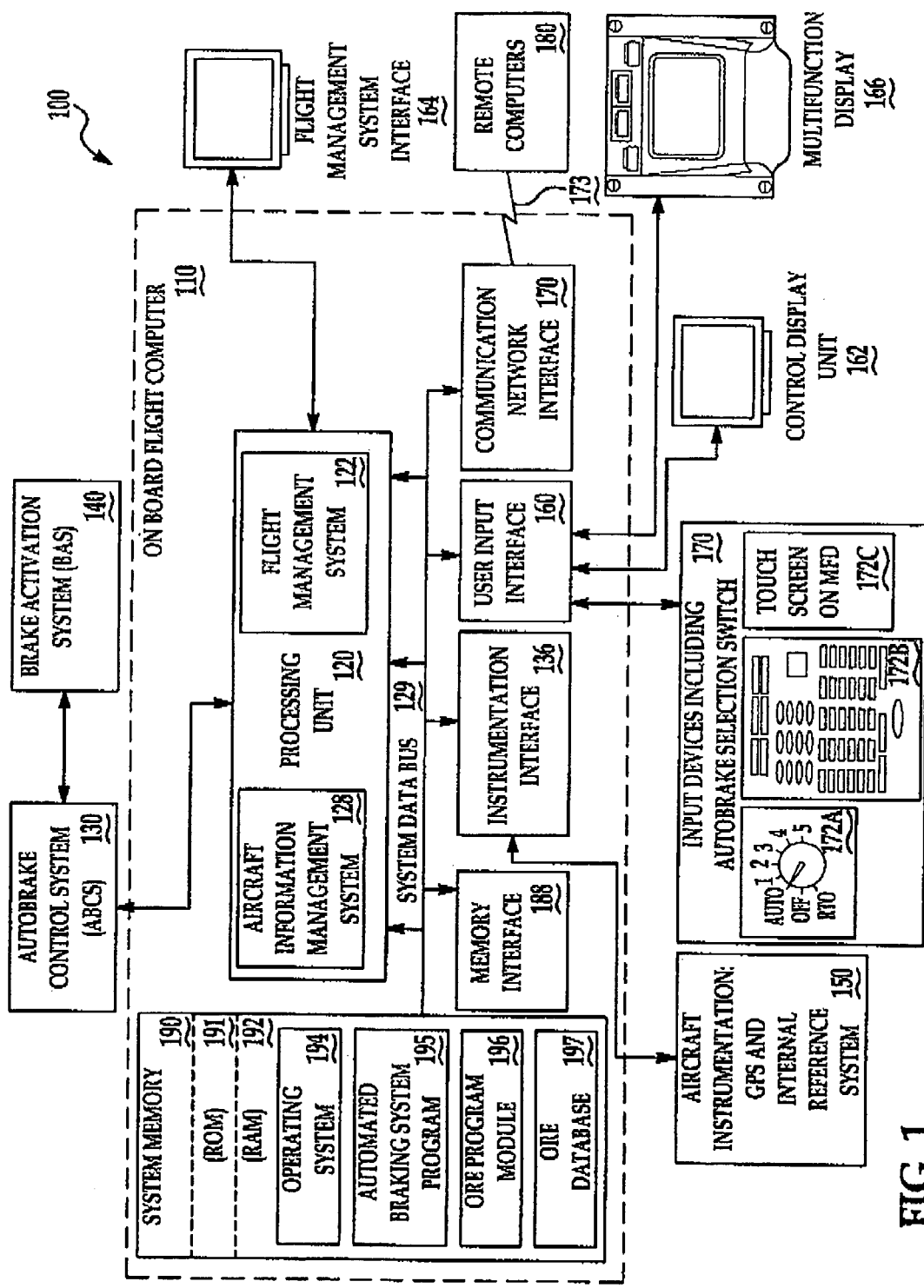
FIG. 1 is an aircraft system in accordance with an exemplary embodiment.

The following detailed description is merely exemplary in nature and is not intended to limit the described embodiments or the application and uses of the described embodiments. As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Overview

It is desirable to provide improved techniques for landing an aircraft so that an aircraft can reduce its ground velocity to a target velocity at a selected point on a particular landing runway and/or exit taxiway (ET). It is also desirable to provide improved techniques which can allow a pilot to adjust variables which are used to predict landing performance. It is also desirable to provide improved techniques which can provide visual feedback to a pilot as he/she adjusts such variables as the pilot is preparing to land and/or is landing an aircraft. It is also desirable to provide improved runway exiting techniques which help runway throughput especially during Instrument Meteorological Condition (IMC) operations. It is also desirable to provide improved safety and techniques for improving pilot awareness during landing rollout utilizing appropriately configured displays of real time landing performance. Other desirable features and characteristics of the improved runway exiting techniques will become apparent from the subsequent detailed description and the appended claims, taken in conjunction with the accompanying drawings and the foregoing technical field and background.

Broadly, embodiments relate to optimized runway exiting (ORE) techniques and technologies which can allow a pilot or flight crew to select a desired landing runway and a desired exit taxiway (ET) or a stopping point on the desired landing runway prior to landing, and then consistently slow the aircraft to an appropriate taxi speed at the appropriate place on the desired landing runway and a desired exit taxiway (ET) so that the aircraft can exit the runway at the desired exit taxiway (ET). The optimized runway exiting (ORE) techniques and technologies can allow a pilot to adjust variables which are used to predict landing performance, and can provide visual feedback to a pilot as he/she adjusts such variables as the pilot is preparing to land an aircraft. Among other things, the optimized runway exiting (ORE) techniques and technologies can improve runway exiting techniques and help increase runway throughput.

In one implementation, a system is provided which can allow a pilot to land an aircraft at a selected position on a particular runway by controlling activation of an automatic braking system of the aircraft so that the aircraft reaches a specified velocity at the selected position on the particular runway. The system includes one or more display units which display default landing parameters and aircraft performance parameters. The system also includes a computer programmed to determine predicted landing performance based on the default landing parameters and the aircraft performance parameters.

A display unit displays an airport map which includes a default runway having a number of exit taxiways. Indicia of the predicted landing performance are also displayed on the airport map at locations along the default runway. The indicia of predicted landing performance displayed on the airport map can include one or more of: a Runway Exit Indicator (REI), a Runway Exit Target (RET), and a dynamic Landing Performance Indicator (LPI).

During flight, the pilot can use an input device to input at least one new landing parameter prior to landing. The new landing parameters can include updated landing variables and/or updated landing condition variable. The updated landing condition variables can include, for example, an updated runway surface condition of the particular runway, and an updated braking action information based on current braking action reports, whereas the updated landing variable(s) can include one or more of an updated value of the specified velocity; an updated reverse thrust adjustment value; an updated value for the selected position. The aircraft performance parameters can include, for example, landing weight, landing flap settings, planned approach and landing speeds, current wind and temperature, etc.

The computer computes update current landing parameters each time one or more of the landing parameter is changed, and also determines updated predicted landing performance based on current landing parameters and the aircraft performance parameters.

An updated airport map is then displayed which displays a currently selected runway (this can be the default runway if the pilot did not input a new runway when entering updated landing parameters). In addition, updated indicia of updated predicted landing performance can be displayed on the currently selected runway for at least one exit taxiway. The updated indicia of updated predicted landing performance which are displayed on the updated airport map can include: an updated Runway Exit Indicator (REI), an updated Runway Exit Target (RET), an updated Brake Activation Target (BAT) and an updated static while airborne/dynamic upon landing Landing Performance Indicator (LPI), and can also include a recommended setting for the automatic braking system that will provide dynamic braking to slow the aircraft to the specified velocity at the selected position on the particular runway.

When a sufficient number of aircraft are implemented with optimized runway exiting (ORE) techniques and technologies, aircraft spacing can be tightened during landing operations (especially during Instrument Meteorological Conditions (IMC)) and increase landing runway throughput to increase airport arrival rates. By aiding airlines in taxiing to desired gates, congested, difficult or lengthy taxi routings are avoided. Brake wear or engine wear can also be reduced when optimized for ORE functions. Other advantages are more efficient and managed ground traffic flow, expedited runway clearance, improved landing performance during rollout (especially during low visibility IMC), and a retrofit of a simpler version into older aircraft models. Thus, these techniques can result in more efficient ground operation and can also reduce taxi time, brake wear, engine wear, etc. thereby providing safety and economic advantages to airlines and their customers. A display provides landing performance information to pilots during landing rollout thereby increasing pilot situational awareness and safety. This mechanism also operates during manual braking.

FIG. 1 is an aircraft system 100 in accordance with an exemplary embodiment. The aircraft ORE system 100 includes an on-board flight computer 110, an automatic brake control system (ABCS) 130, a brake activation system (BAS) 140, aircraft instrumentation 150, a control display unit (CDU) user interface 162, a flight management system (FMS) user interface 164, a multifunction display (MFD) user interface 166, and various input devices 170 including an autobrake selection switch 172A, a keypad 172B which includes a cursor controlled device, and one or more touchscreen input devices 172C which can be implemented as part of the CDU interface 162, the FMS user interface 164 and the MFD user interface 166. The on-board flight computer 110 can communicate with a remote computer which can be located at the Air Traffic Services (ATS over a wireless data-link 173. As will be described below, the aircraft system 100 can be used to slow a landing aircraft to a selected speed at a selected position on a particular runway by controlling activation of automatic braking system 130,140.

The on-board flight computer 110 includes a processing unit 120 which implements a flight management system 122 and an aircraft information management system 128, an instrumentation interface 136, a user input interface 160, a communication network interface 170, a memory interface 188 and a system memory 190. The various modules in the on-board flight computer 110 communicate with one another over a system data bus 129. For example, the processing unit 120 utilizes the system data bus 129 to communicate with: flight management system interface 164 via the flight management system 122, the auto brake control system (ABS) 130 via the aircraft information management system 128, aircraft instrumentation 166 via instrumentation interface 136, the system memory 190 via memory interface 188, various input devices 170 via user input interface 160, the CDU user interface 162, the FMS user interface 164 and the MFD user interface 166 via the user input interface 160, remote computers 180 over a wireless communication link 173 via the communication network interface 170.

The CDU interface 162, the FMS user interface 164 and the MFD user interface 166 can be implemented using any man-machine interface, including but not limited to a screen, display or other user interface (UI). In addition, more than one instance of each of the CDU interface 162, the FMS user interface 164 and/or the MFD user interface 166 can be provided. The MFDs are forward multi-function displays within the forward field of view. Different information can be displayed on the MFDs at the control of the pilot. The MFDs can be programmed to display not only flight or plan information but can be programmed to serve as a human interface to capture and display ORE information.

The system memory 190 can includes volatile memory (such as RAM 192), non-volatile (such as ROM 191, flash memory, etc.) or some combination of the two. The RAM 192 includes an operating system 194, an automated braking system program 195, an optimized runway exiting (ORE) program module 196 and an ORE database 197 for storing ORE data which can include an airline policy file (APF) which includes applicable and default runway parameters for all desired airports, such as landing point assumption distance, runway exit target point distance, taxiway exit speed including under braking action reporting, navigation reference point adjustment, braking performance display threshold, delayed braking threshold, and other parameters.

The flight management system 122 provides a mechanism for the manual data capture and distribution of ORE related information. Among its other functions, the flight management system 122 can access ORE data regarding applicable runway parameters for all desired airports.

The aircraft information management system 128 provides aircraft systems information relating to landing parameters, i.e. landing weight, current winds and temperature, landing configuration, airspeed and ground speed, etc.

The aircraft instrumentation 150 can include, for example, a Global Position System which provides GPS information regarding the position of the aircraft, an Inertial Reference System which provides velocity and acceleration information regarding the velocity and acceleration of the aircraft, and Multi Function Displays (MFD) for the presentation of ORE information and interfacing to the cockpit crew.

The input devices 170 can generally include, for example, any switch, selection button, keypad, keyboard, pointing devices (such as a cursor controlled device or mouse) and/or touch-based input devices including touch screen display(s) which include selection buttons that can be selected using a finger, pen, stylus, etc. In one implementation, the CDU user interface 162, the FMS user interface 164 and the MFD user interface 166 can include one or more actual selection buttons, one or more virtual selection buttons displayed on the interfaces, or a combination thereof. In one implementation, objects are displayed on the CDU user interface 162, the FMS user interface 164 and the MFD user interface 166 so that the pilot can select objects displayed on the CDU user interface 162, the FMS user interface 164 and the MFD user interface 166 via a touch input. In this embodiment, the input devices 170 also include a Flight Management System (FMS) keypad 172B with a cursor controlled pointing device or other display keypad.

As illustrated in FIG. 1, the input devices 170 also include an autobrake selection switch 172A which is used to select a particular autobrake selection. The autobrake selection switch 172A is provided on the flight deck and allows the flight crew to select the desired braking mode of the aircraft. In one implementation, the autobrake selection switch includes a number of values or settings including: OFF, AUTO, 1-5 and RTO. The position "OFF," means that the autobrake system is turned off, and positions "1," "2," "3," "4," and "5," represent predetermined aircraft deceleration settings from a low deceleration setting of "1" to the highest AUTOBRAKING deceleration setting of "5." The "RTO" position is provided to apply full brake pressure if the flight crew initiates a Rejected Take-Off (RTO). The ORE program module 196 confirms whether the autobrake selection switch 172A is in the "AUTO" position. If the autobrake selection switch 172A is in the "AUTO" position, then ORE can be implemented as described below. Selecting the AUTO position on the AUTOBRAKE selector switch 172A "arms" the ORE system. Having the AUTOBRAKE selector switch 172A in the AUTO position is required for the dynamic after-landing operation of ORE. The AUTOBRAKE selector switch 172A can be implemented with a solenoid that is held in the AUTO position if all input parameters for ORE operation have been met. By contrast, if the autobrake selection switch 172A is in a position other than the "AUTO" position, then ORE is not utilized (but as discussed below the dynamic landing display with Landing Performance Indicator (LPI) will be displayed). ORE is not utilized, for example, when the autobrake selection switch 172A is "OFF," when the pilot has assumed control of brakes, or when the autobrake selection switch 172A is in a different position (e.g., 1-5) and another autobrake selection is active.

When activated the automatic brake control system (ABCS) 130 provides a control signal which controls a brake activation system (BAS) 140. The automatic brake control system (ABCS) 130 is immediately disarmed, for example, when either throttle is advanced after landing, when the pilot manually brakes, when "OFF" is selected on the autobrake selector switch, when there is an air data inertial reference unit (ADIRU) failure, when there is an autobrake fault, when there is a normal antiskid system fault, or when the normal brakes experience a pressure loss, etc. Whenever the automatic braking system is disarmed, the autobrake selection switch 172A moves to the "OFF" position.

Figure 2:
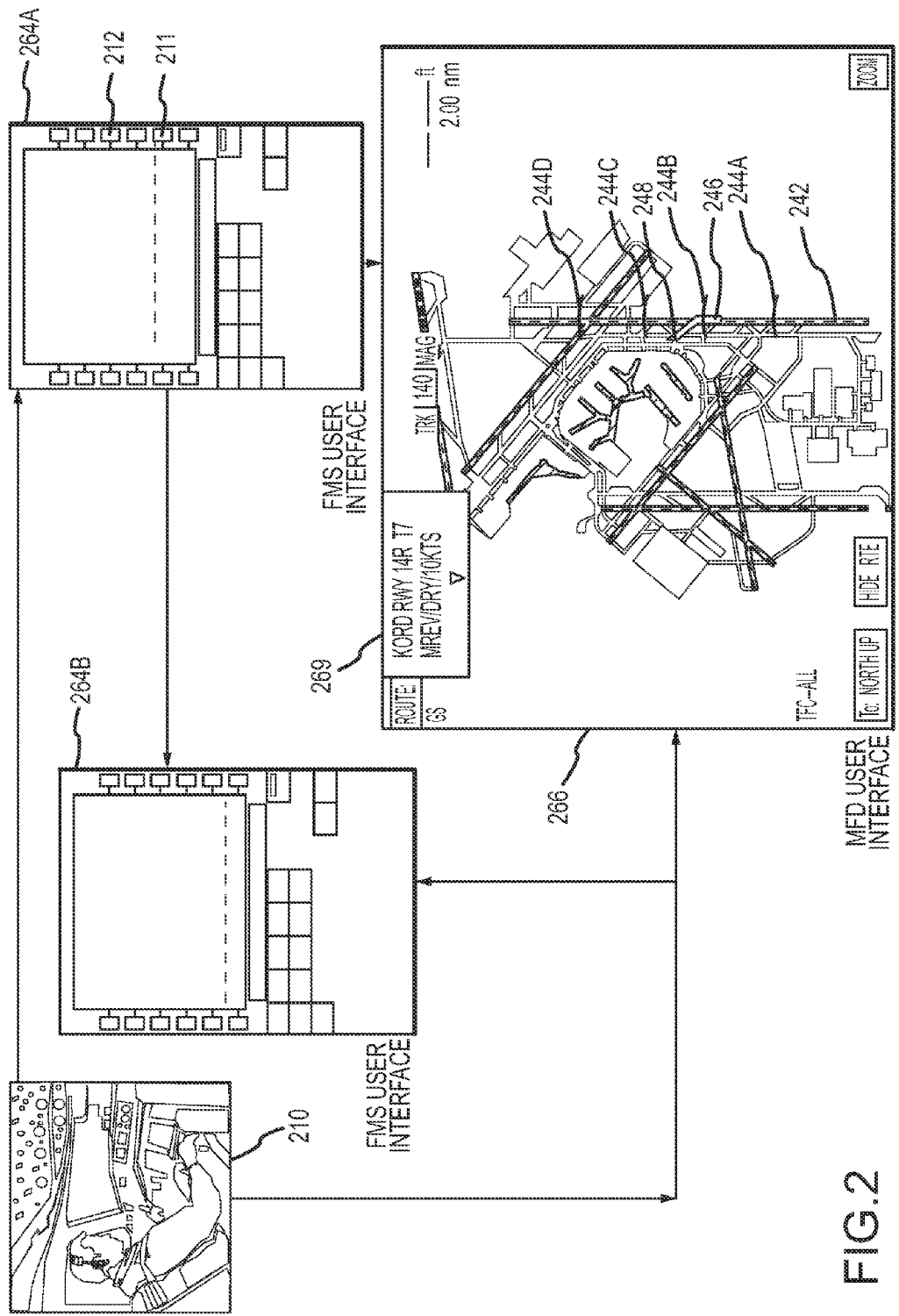
FIG. 2 is a block diagram which illustrates operation of an Optimized Runway Exiting (ORE) program module and a processing unit during a plan mode when a pilot inputs landing performance parameters and receives visual feedback via a flight management system (FMS) user interface and a multifunction display (MFD) user interface as the pilot is preparing to land the aircraft in accordance with one embodiment.

FIG. 2 is a block diagram which illustrates operation of the ORE program module 196 and the processing unit 120 during a plan mode when a pilot inputs landing performance parameters and receives visual feedback via the FMS user interface 164 and the MFD user interface 166 as the pilot is preparing to land the aircraft in accordance with one embodiment. FIG. 2 will be described with reference to FIG. 1 above.

Block 210 illustrates a pilot sitting in a cockpit of an aircraft as the pilot is preparing to land the aircraft. Among other things, the cockpit includes the FMS user interface 164, the MFD user interface 166 and input devices 170.

Block 264A illustrates an arrivals page 264A that is displayed on the flight management system (FMS) user interface 164. The arrivals page 264A includes a landing performance selection button 211 which can be used to jump directly to a landing performance modification FMS page, and a taxiway exit selection button 212 which can be used to jump to the ORE default page. The pilot (or other crew member) can activate or initiate ORE by pushing the taxiway exit selection button 212 to select the ORE option.

Activation of Optimized Runway Exiting (ORE) and Default Mode

When the ORE system is activated, the processing unit 120 initiates the optimized runway exiting (ORE) routine defined in the ORE program module 196, and determines default predicted landing performance based on default landing parameters and aircraft performance parameters. The aircraft performance parameters are parameters such as weight of the aircraft, configuration of the aircraft, information included in an airline policy file (APF) which includes information such as landing point assumption distance, runway exit target point distance, taxiway exit speed (including under braking action reporting), navigation reference point adjustment, braking performance display threshold, delayed braking threshold, and other information. etc. The landing parameters are aircraft systems information and variables which can change or which can be changed by the pilot during flight. For example, the landing parameters can include a runway and exit taxiway, defined rollout distance setting which describes a specified velocity at a selected position on a particular runway, a Land and Hold Short (LAHSO) setting, a thrust reverse setting (maximum reverse (MREV)/idle reverse (IREV)), a braking action (BA) MU setting, a minimum equipment list (MEL) setting, and a delayed braking setting.

The ORE program module 196 communicates default landing parameters to the flight management system (FMS) which displays the default landing parameters to the pilot on one or more ORE pages 264B of the flight management system (FMS) user interface 264. Block 264B illustrates one example of an ORE page 264B that is displayed on the flight management system (FMS) user interface 164. Various example instantiations of the ORE page 264B will be described in detail below with reference to FIGS. 6-7H.

In addition, the ORE program module 196 uses default landing parameters to generate a default airport map 266 with a default runway 242 having a number of exit taxiways, and markings or indicia 244A-D, 246, 248 of predicted landing performance for at least one exit taxiway can also be displayed on the default runway 242. The indicia 244A-D, 246, 248 of predicted landing performance are determined by the ORE program module 196 based on the default landing parameters and the aircraft performance parameters. In this particular example, the indicia 244A-D, 246, 248 of predicted landing performance include one or more Landing Performance Indicators (LPIs) 244A-D which correspond to at least one of the predetermined autobrake selection switch 172A settings (1-4), a Runway Exit Target (RET) 246 and a Runway Exit Indicator (REI) 248; however, other indicators of predicted landing performance can also be included. The number of LPIs displayed depends on whether the aircraft is airborne, whether the autobrake selection switch 172A has been set to the "AUTO" position, or whether the aircraft has landed. Various example instantiations of the "runway" map 266 will be described in detail below with reference to FIGS. 8A-10B.

Referring again to FIG. 2, to provide visual feedback to the pilot, the MFD user interface 166 displays an airport map 266 which indicates default predicted landing performance via the default landing parameters. The airport map 266 includes a default runway 242 having a number of exit taxiways including a default exit taxiway 246, and a menu 269 which displays default landing parameters. In addition, indicia 244A-248 of predicted default landing performance is displayed on the default runway 242. The indicia 244A-248 of predicted default landing performance is determined based on default landing parameters and/or aircraft performance parameters. In one exemplary embodiment, the indicia 244A-248 of predicted default landing performance displayed on the airport map 266 include Landing Performance Indicator(s) (LPIs) 244A-D which correspond to each of the predetermined autobrake selection switch 172A settings (1-4), a Runway Exit Target (RET) 246 representing an exit target on the default runway 242 and Runway Exit Indicator (REI) 248 representing an exit on the default runway 242. The indicia 244A-248 of predicted landing performance will be described in greater detail below.

If the pilot decides that the predicted default landing performance is acceptable, the pilot can accept the default landing parameters by setting the autobrake selection switch 172A to the "AUTO" position, and the MFD user interface 266 displays a runway map (not show) in a "plan mode" as described below.

Update Mode

However, if prior to landing the pilot decides to change one or more of the default landing parameters, the pilot can use one of the input devices 170 to input non-default or updated landing parameter(s). As will be described below, using one or more of the selection buttons on the default landing parameters page 264B, the pilot can select one or more landing parameters and change selected landing parameters. The new landing parameters specified by the pilot can include updated landing condition variable(s), updated landing variable and other modifications to default values for landing conditions. The updated landing condition variables can include, for example, an updated runway surface condition of the particular runway; an updated Braking Report Information or coefficient (MU) based on current braking action (BA) reports, or other updates to current landing conditions. By contrast, the updated landing variables can include, for example, an updated value of the specified velocity; an updated reverse thrust adjustment value; an updated value for the selected position; or other updates to current landing conditions.

For example, when the pilot decides to change landing parameters which include the specified velocity and the selected position, the pilot can interactively adjust the one or more of these landing parameters to enable the aircraft to reach the specified velocity at the selected position on the particular runway. The selected position can be, for example, a particular taxiway exit located on a particular landing runway, or a particular runway target position on the particular landing runway. The specified velocity can be a velocity that is greater than or equal to zero. LAHSO is the definition of a landing RET short of a specific runway and zero KTS ground speed. Specific targets can be defined for those runways that allow LAHSO operations. When a LAHSO target is selected by the pilot, a LAHSO target position with a speed of zero KTS is selected. Other velocity adjustments may be necessary to allow for braking conditions, for instance, 3 knots (KTS) at RET because braking action is reported as Fair.

Each time one of the landing parameters is changed, this causes the processing unit 120 to communicate the new landing parameters to the ORE database 197 to update current values of the landing parameters. The processing unit 120 and the ORE program module 196 can then automatically recompute the "updated" predicted landing performance based on the current values of the landing parameters and aircraft performance parameters.

The updated predicted landing performance information can then be displayed to the pilot on the MFD user interface 166 as a new or updated airport map (not shown) which indicates new predicted landing performance for a selected runway and an updated menu of updated landing parameters.

The updated predicted landing performance information can also be displayed on a new page of the FMS user interface 164.

During update mode, the pilot can keep updating the current landing parameters as he prepares to land the aircraft, and the predicted landing performance will be updated based on the most current landing parameters and the aircraft performance parameters, and then displayed on the MFD user interface 166 as an airport map to provide the pilot with visual feedback regarding the current predicted landing performance.

Set Mode

Once the pilot is satisfied with the predicted landing performance, the pilot can arm the autobrake control system (ABCS) 130 using the autobrake selection switch 172A. When the autobrake selection switch 172A has been set or placed in the "AUTO" position, the MFD user interface 266 display an airport map in "plan mode" which indicates that the aircraft is airborne, along with an airport map in a runway up configuration. In one implementation which will be described below, the updated airport map displays an updated Runway Exit Indicator (REI), an updated Runway Exit Target (RET), and an updated Brake Activation Target (BAT) (as necessary) and four updated static Landing Performance Indicators (LPIs) as colored arcs on the landing runway of the airport map 266. In some embodiments, each LPI can also include recommended setting(s) for the autobrake selection switch 172A that will cause the automatic braking system 130 to control the brake activation system (BAS) 140 to provide dynamic braking to slow the aircraft to the specified velocity at selected positions on the particular runway.

Landing Mode

When the aircraft lands on the particular landing runway, the automated braking system program 195 and the processing unit 120 can then determine a deceleration rate required for slowing the aircraft to reach the specified velocity at the selected position. The automated braking system program 195 and processing unit 120 continuously determine the deceleration rate based on a current position and a current ground velocity of the aircraft. For example, in one implementation, upon landing the automated braking system program 195 and the processing unit 120 determine a current position of the aircraft based on a Global Positioning System (GPS) position input from GPS instrumentation 150, and a current ground velocity of the aircraft based on an input from the an inertial reference system instrumentation 150. Using the information regarding its current position and its current ground velocity, the automated braking system program 195 and the processing unit 120 calculate a deceleration rate required for slowing the aircraft to reach the specified velocity at the selected position. The automated braking system program 195 and processing unit 120 continuously updates the deceleration rate based on its current position and its current ground velocity until the aircraft reaches the specified velocity at the selected position.

In one exemplary embodiment, based on the position and the ground velocity, the automated braking system program 195 and the processing unit 120 determine or calculate a deceleration rate required for slowing the aircraft to reach the specified velocity at the selected position using an approach like that described, for example, in U.S. Pat. No. 5,968,106 titled "Aircraft stop-to-position autobrake control system," which is incorporated by reference herein in its entirety.

The processing unit 120 regularly provides the deceleration rate to the aircraft information management system 128, which in turn provides the deceleration rate to the autobrake control system (ABCS) 130. Using the deceleration rate, the ABC 130 generates a control signal and sends it to the brake activation system 140. The control signal controls the brake activation system 140 to decelerate the aircraft at a substantially constant rate until the aircraft reaches the specified velocity at the selected position.

As the aircraft is decelerating, the MFD user interface 166 displays actual landing performance with respect to the selected position as the aircraft approaches the selected position. The actual landing performance which is displayed is based on a current ground velocity of the aircraft and the current deceleration rate. In one exemplary embodiment, as part of the actual landing performance, the control display unit 162 displays the airport map with the dynamic Landing Performance Indicator (LPI) displayed as a moving colored are on the airport map, the REI, the RET and other information. The LPI is dynamic since it moves as a result of dynamic braking, and indicates the target position where rollout speed equals the speed defined as default in the APF. Even during manual braking, the actual landing performance information is displayed on a runway map displayed on the MFD user interface 166 can provide the pilot with a valuable landing aid.

Exemplary embodiments will now be described with reference to FIGS. 3-5 for landing an aircraft on a particular runway and using an automatic braking system 130 to automatically control a brake activation system 140 of the aircraft so that the aircraft reaches a specified velocity at a selected position on the particular runway.

Figure 3:
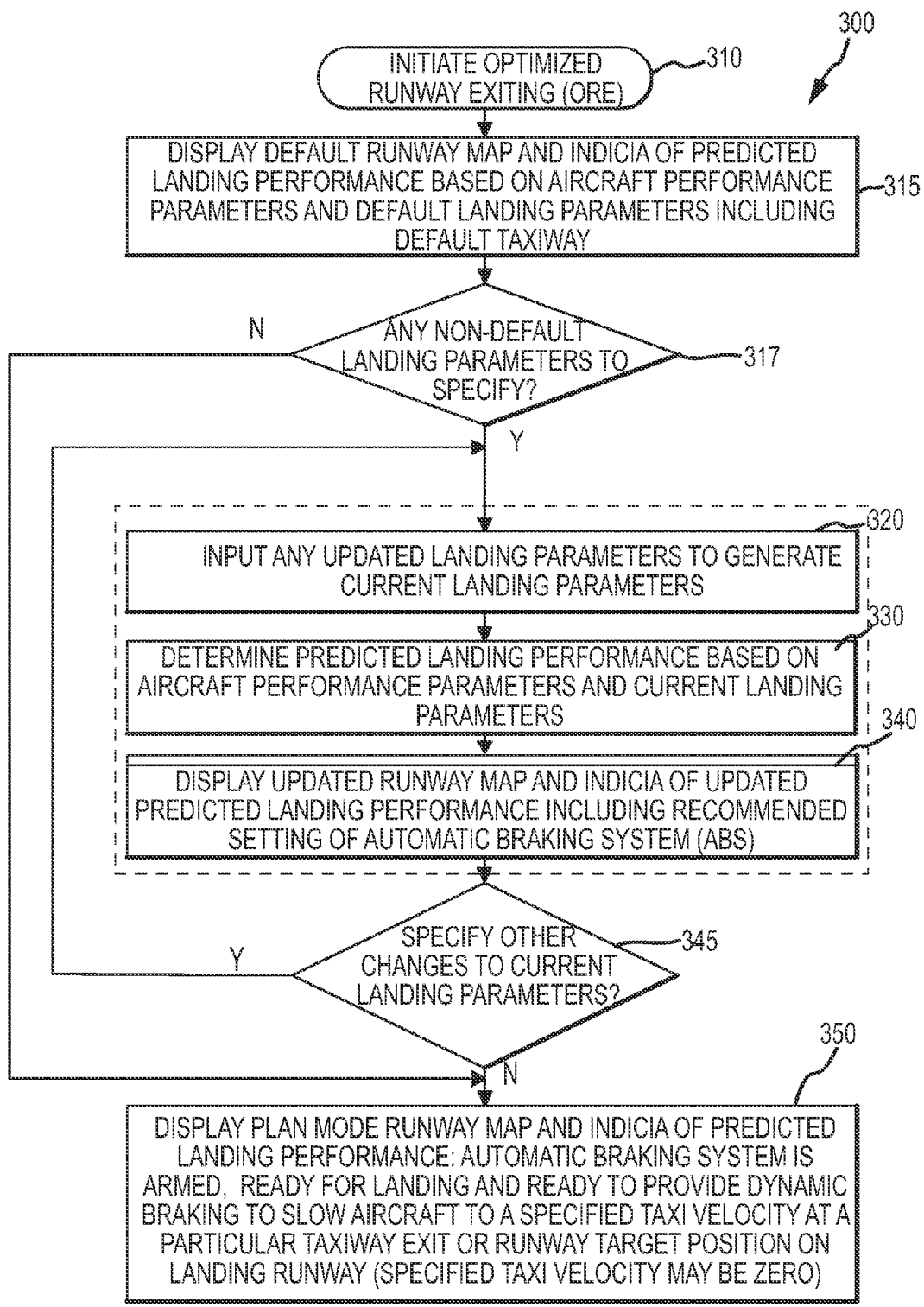
FIG. 3 is a flow chart which illustrates a method for optimizing predicted landing performance in accordance with one embodiment.

FIG. 3 is a flow chart which illustrates a method 300 for optimizing predicted landing performance in accordance with one embodiment. To optimize predicted landing performance, the pilot (or other crew member) inputs or adjusts one or more landing parameters, and the ORE program module 196 computes predicted landing performance. The predicted landing performance is then displayed to provide the pilot with visual feedback regarding predicted landing performance as the pilot prepares to land an aircraft at a particular position on a particular landing runway. In the exemplary embodiment illustrated in FIG. 3, steps 310-350 are pre-landing events that occur while the aircraft is in the air before the aircraft lands.

At step 310, an optimized runway exiting (ORE) is initiated, which causes on-board flight computer 110 to determine predicted landing performance based on default landing parameters, and to display an airport map with a default runway having a number of exit taxiways at step 315. The predicted landing performance is determined based on default landing performance parameters and aircraft performance parameters, as described above. The airport map includes indicia of predicted default landing performance which can include, for example, a Runway Exit Indicator (REI), a Runway Exit Target (RET), and one or more Landing Performance Indicators (LPIs). The indicia of predicted default landing performance can also be displayed independently of the map, for example, on another monitor or page.

At step 317 the pilot determines whether to change the default landing parameters by specifying one or more new (non-default) landing parameters as described above. For instance, a pilot can update rollout distance landing parameters to specify a different selected position on the particular runway, and a different specified velocity at the different selected position; or a different selected position on a different runway, and a different specified velocity at the different selected position on the different runway; or a target taxi velocity at a particular target point on the particular landing runway; or a runway hold short stopping point with 0 KTS ground speed in the case of "Land and Hold-short (LASHO)" clearance. The pilots can also change/modify/adjust one or more of the other landing parameters described above.

If the pilot decides to specify one or more new landing parameters, the pilot uses an input device 172B, 172C to input new (non-default) landing parameter(s) at step 320. This causes the on-board flight computer 110 to generate current landing parameters using the remaining default landing parameters and the one or more new (non-default) landing parameter(s). At step 330, on-board flight computer 110 to determines "updated" predicted landing performance based on current landing parameters and the aircraft performance parameters. At step 340, an updated airport map and the "updated" predicted landing performance are displayed to provide visual feedback to the pilot. For instance, in one implementation, the updated airport map displays an updated REI, an updated RET, and an updated LPI. The updated predicted landing performance can also include one or more recommended settings for the automatic brake control system 130, which the pilot can use to set the autobrake selection switch 172A. The recommended settings for the automatic brake control system 130 are settings which will provide dynamic braking to slow the aircraft to the specified velocity at the selected position on the particular runway. Before setting the autobrake selection switch 172A to the recommended setting at step 350, the pilot decides whether to specify additional changes to the current landing parameters at step 345. If there are further changes to the current landing parameters, then the pilot uses an input device 170 B,C to input one or more landing parameters at step 320 and steps 330-345 then repeat again. If there are no further changes to the current landing parameters the pilot "arms" the automatic braking control system 130 at step 350 by setting the autobrake selection switch 172A to one of the recommended settings. Once the automatic braking control system 130 is armed, the aircraft is ready for landing and the automatic braking control system 130 will control the braking activation system 140 to ensure that the aircraft is slowed to the specified velocity at the selected position on the particular runway as described, for instance, with reference to FIG. 4.

Figure 4:
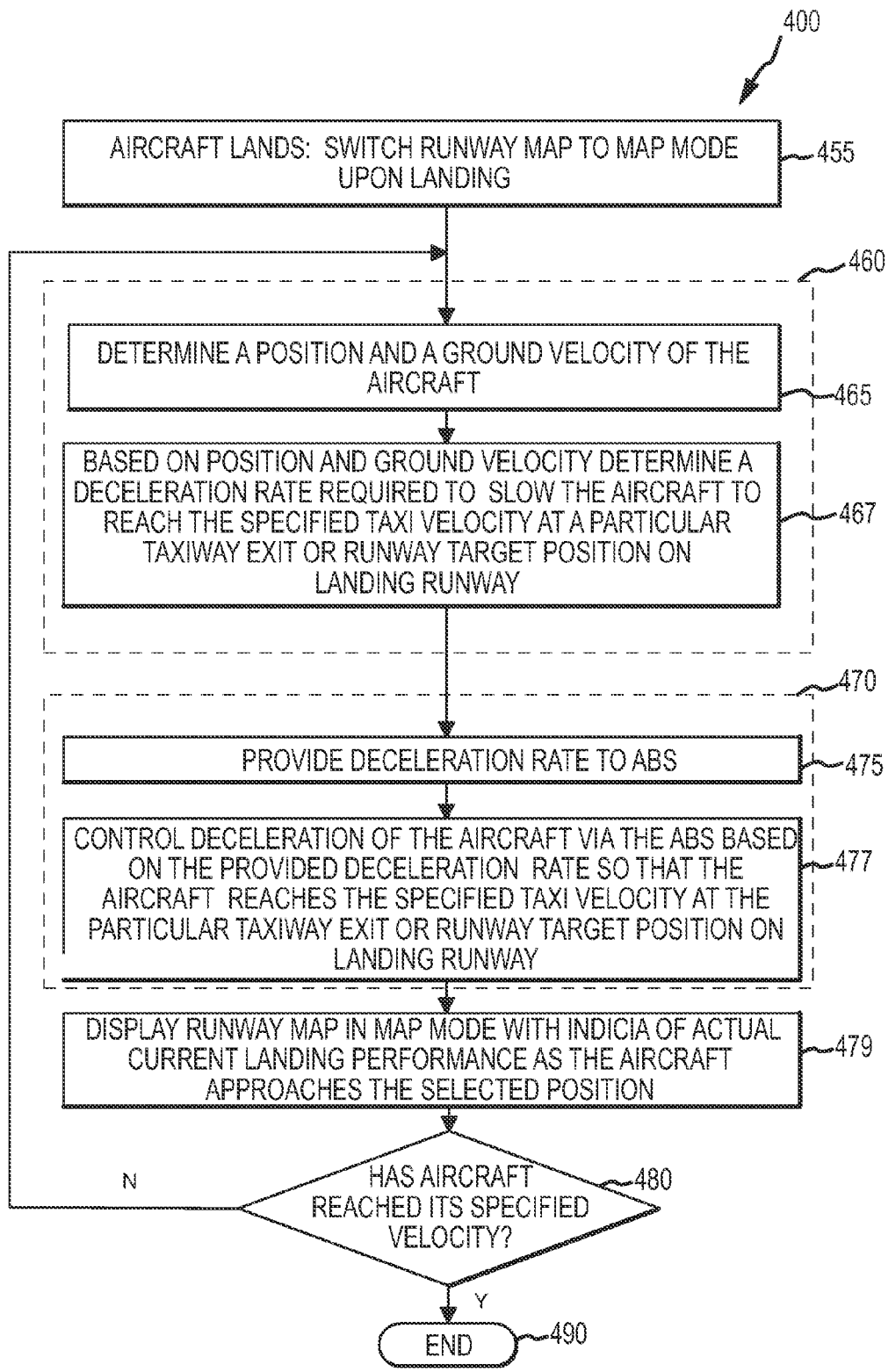
FIG. 4 is a flow chart which illustrates an optimized runway exiting (ORE) method 400 for providing visual feedback to a pilot regarding actual landing performance as the pilot lands the aircraft in accordance with one embodiment.

FIG. 4 is a flow chart which illustrates an optimized runway exiting (ORE) method 400 for providing visual feedback to a pilot regarding actual landing performance as the pilot lands the aircraft in accordance with one embodiment. In the exemplary embodiment illustrated in FIG. 4, steps 455-490 are post-landing events that occur once the aircraft has landed.

The method 400 begins at step 455 when the aircraft lands or "touches down" on the runway.

At step 460, upon landing, the on-board flight computer 110 determines a deceleration rate required for slowing the aircraft to reach a specified velocity (i.e., greater or equal to zero knots (KTS)) at a selected position based on a current position of the aircraft and a current ground velocity of the aircraft. The selected position can be, for example, a default exit taxiway (ET), a pilot-specified exit taxiway located on a particular landing runway, or a particular runway target position on the particular landing runway. Step 460 can be performed in a number of different ways. In the exemplary implementation illustrated in FIG. 4, step 460 includes two sub-steps 465, 467. At step 465, the on-board flight computer 110 determines, upon landing, a current position of the aircraft based on a Global Positioning System (GPS) position input from a GPS system in aircraft instrumentation 150, and a current ground velocity of the aircraft based on an input from an inertial reference system in aircraft instrumentation 150. At step 467, the on-board flight computer 110 calculates, based on the current position and the current ground velocity, a deceleration rate required for slowing the aircraft to reach the specified velocity at the selected position.

At step 470, the on-board flight computer 110 and the ABCS 130 operate together to control deceleration of the aircraft via the BAS 140 based on the deceleration rate so that the aircraft will reach the specified velocity at the selected position. Step 470 can be performed in a number of different ways. In the exemplary implementation illustrated in FIG. 4, step 470 includes two sub-steps 475, 477. At step 475, the on-board flight computer 110 provides the deceleration rate to the ABCS 130, and at step 477, the ABCS 130 controls deceleration of the aircraft based on the deceleration rate by sending a braking control signal to the BAS 140 which modulates application of the aircraft brakes to decelerate the aircraft in a controlled manner (e.g., at a substantially constant rate) until the aircraft reaches the specified velocity at the selected position.

At step 479, the on-board flight computer 110 operates together with the display 166 to display the actual landing performance with respect to the selected position on an airport map displayed on the display 166 to provide continuous visual feedback to the pilot as the aircraft approaches the selected position until it is determined that the aircraft has reached the specified velocity at step 480 and the method 400 ends at step 490. The actual landing performance is based on a current ground velocity of the aircraft and the current deceleration rate. If the on-board flight computer 110 determines that the aircraft has not reached the specified velocity at step 480, the method 400 loops back to step 460 where the on-board flight computer 110 updates the current position and the current ground velocity of the aircraft, calculates an updated deceleration rate based on the updated position and the updated ground velocity of the aircraft at step 467, and controls deceleration of the aircraft via the automatic braking system based on the updated deceleration rate so that the aircraft reaches the specified velocity at the selected position.

Figure 5:
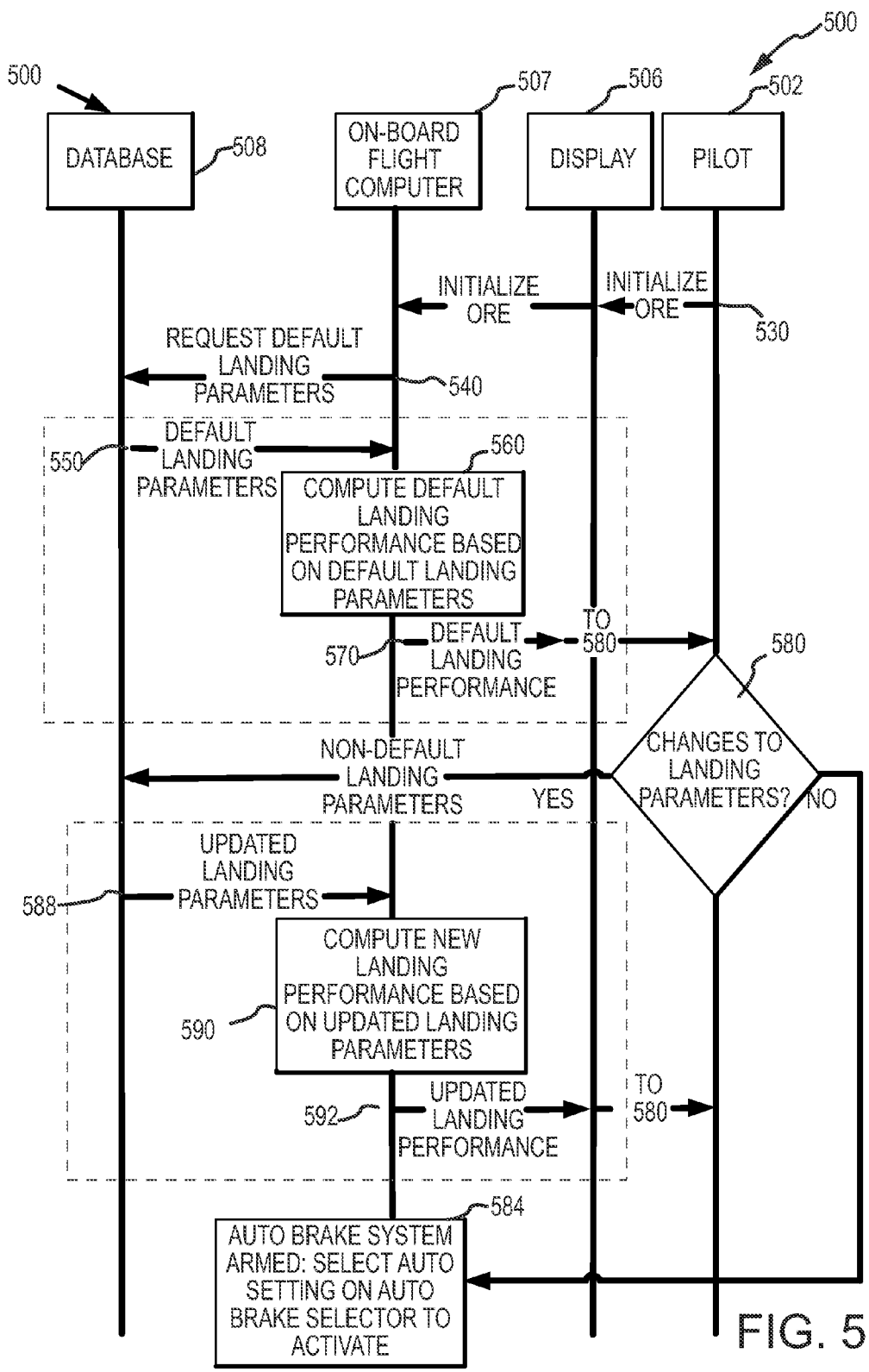
FIG. 5 is an information flow diagram which illustrates interaction between a pilot, a display, an on-board Flight Management System (FMS) computer, and a database as the pilot optimizes predicted landing performance in accordance with one embodiment.

FIG. 5 is an information flow diagram 500 which illustrates interaction between a pilot 502, a display 506, an on-board light computer 507, and a database 508 as the pilot optimizes predicted landing performance in accordance with one embodiment. The method 500 can be used when the pilot is preparing to land an aircraft at a particular position on a particular landing runway in accordance with an embodiment.

At step 530, the pilot 502 initiates optimized runway exiting (ORE) by entering a command via display which is transmitted to the on-board flight computer 507. This causes the on-board flight computer 507 to request default landing parameters from database 508 at step 540. At step 550, the database 508 provides the default landing parameters to the on-board flight computer 507. The on-board flight computer 507 then uses the default landing parameters and aircraft performance parameters to compute predicted default landing performance at step 560. At step 570, the on-board flight computer 507 communicates the predicted default landing performance to the control display unit 506 which then displays an airport map with a default runway having a number of exit taxiways and indicia of the predicted landing performance on the control display unit 506 to provide visual feedback to the pilot 502. The default landing parameters and the aircraft performance parameters are described above. In one exemplary embodiment, the indicia of the predicted landing performance displayed on the airport map can include REI, RET, and one or more LPIs.

Prior to landing, the pilot determines whether to change one or more of the landing parameters by specifying changes to one or more landing parameters, at step 580. If the pilot decides to update one or more of the landing parameters, the pilot inputs one or more new or non-default landing parameters at step 580 which are transmitted from the on-board flight computer 507 to the database 508 to update the current landing parameters, and at step 588, the database 508 provides the updated landing parameters to the on-board flight computer 507.

At step 590, the on-board flight computer 507 uses the updated landing parameters and the aircraft performance parameters to determine "updated" predicted landing performance which is then displayed in step 592 on the display 506 as part of an updated airport map which provides visual feedback to the pilot regarding the currently predicted landing performance. The updated airport map displays an updated REI, an updated RET, and four updated LPIs. At step 584 the pilot uses the recommended setting by setting the AUTOBRAKE selector switch to AUTO in to provide dynamic braking to slow the aircraft to the specified velocity at the selected position on the particular runway.

If there are further changes to the current landing parameters, then the pilot uses an input device to input one or more changes to the current landing parameters which causes the on-board flight computer 507 to send changes to the current landing parameters to the database 508. The database 508 then sends the updated landing parameters to the on-board flight computer 507 and the on-board flight computer 507 computes "updated" predicted landing performance based on current landing parameters and the aircraft performance parameters at step 590. At step 592, the "updated" predicted landing performance is displayed on the display 506 to provide visual feedback to the pilot regarding updated predicted landing performance.

Ultimately, when there are no further changes to the current landing parameters, the pilot "arms" the automatic braking control system by setting the AUTOBRAKE selector switch to AUTO. Once the automatic braking control system is armed, the aircraft is ready for landing and the automatic braking control system will control the braking activation system as described above to ensure that the aircraft is slowed to the specified velocity at the selected position on the particular runway.

To illustrate operation of the ORE system in some exemplary implementations, examples will now be described of pages which can be displayed on the FMS user interface 164 and of runway maps which can be displayed on the MFD user interface 166.

Exemplary Pages Displayed on the FMS User Interface

Screen shots of example pages which can be displayed on the FMS user interface 164 will now be described with reference to FIGS. 6 through 7H.

Figure 6:
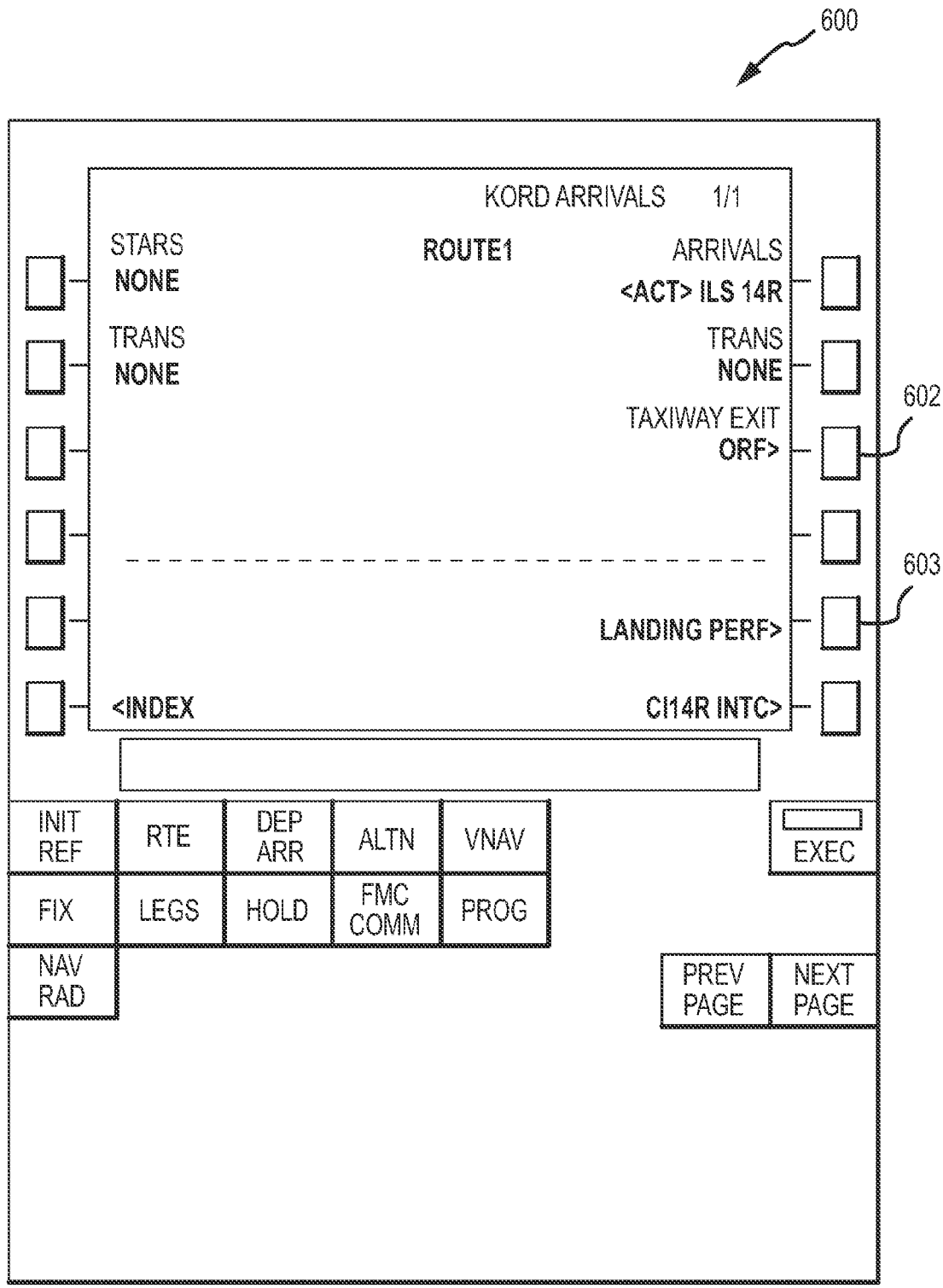
FIG. 6 is a screen shot of an exemplary arrivals page which is displayed on the FMS user interface in accordance with one exemplary implementation.

FIG. 6 is a screen shot of an exemplary arrivals page 600 which is displayed on the FMS user interface 164 in accordance with one exemplary implementation. The page 600 includes a title (KORD ARRIVALS which represents Chicago O'Hare Field), a page number (1/1), and selection buttons including a taxiway exit selection button 602 which presently includes an option for selecting ORE, and a landing performance selection button 603 for selecting another page to change landing parameters. In this example, selection of the taxiway exit selection button 602 jumps to the ORE page where taxiway selections are made.

As will be described below, a pilot can update the landing variables or parameters to specify a ROLLOUT DISTANCE which can be a different selected position on the particular runway, and a different specified velocity at the different selected position; a different selected position on a different runway, and a different specified velocity at the different selected position on the different runway; a target taxi velocity at a particular target point on the particular landing runway; or a runway hold short stopping point with 0 knots (KTS) groundspeed in the case of "Land and Hold-short (LASHO)" clearance. As will be described below with reference to FIGS. 7E and 7F, the pilot can also update the landing variables or parameters to specify a Minimum Equipment List (MEL) adjustments. As will be described below with reference to FIG. 7G, the pilot can also update the landing variables or parameters to specify delayed braking (DB), etc.

Figure 7A:
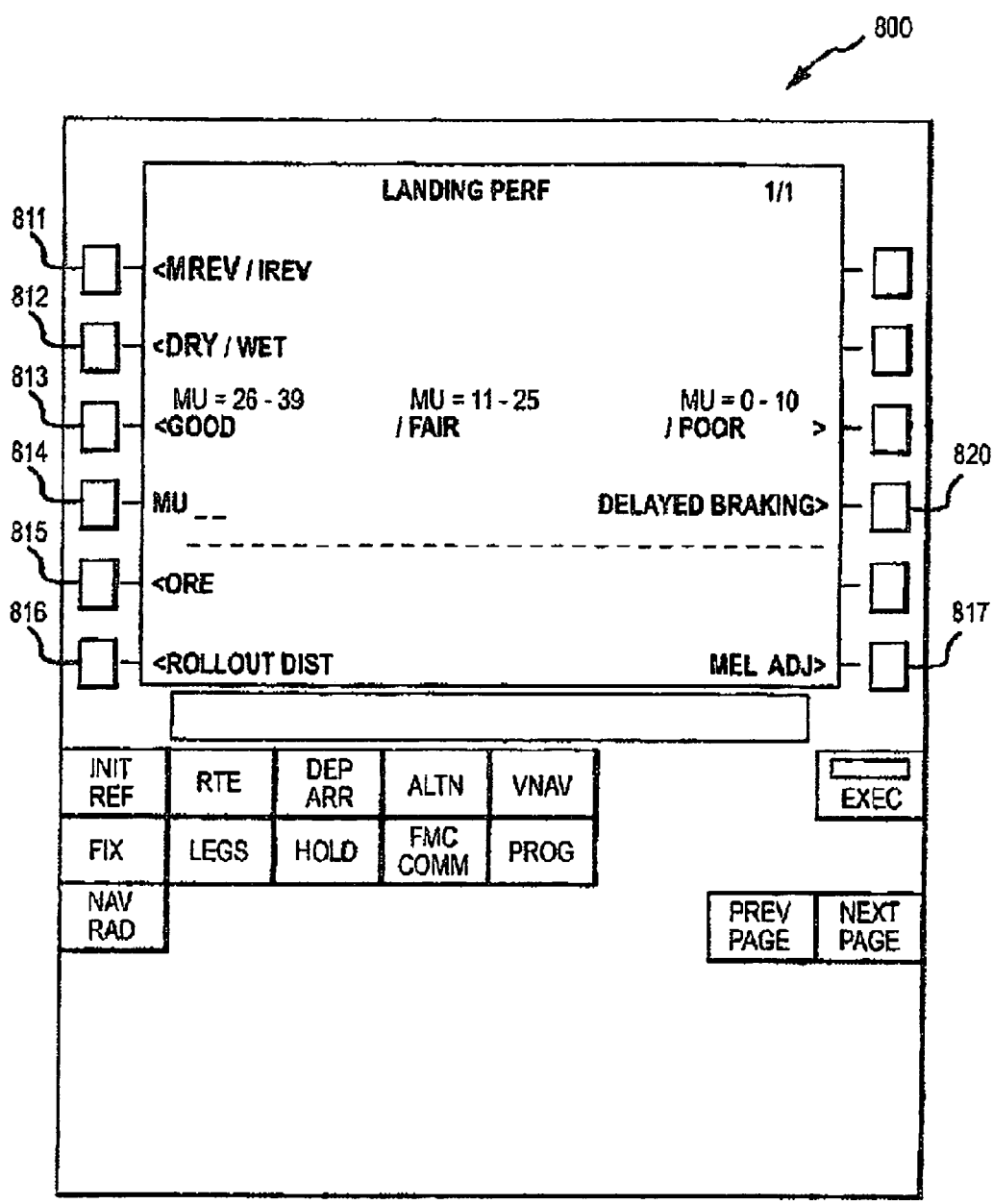
FIG. 7A is a screen shot of an exemplary landing performance page which is displayed on the FMS user interface as a pilot adjusts landing parameters in accordance with one exemplary implementation.

FIG. 7A is a screen shot of an exemplary landing performance page 800 which is displayed on the FMS user interface 164 as a pilot adjusts landing parameters in accordance with one exemplary implementation. The page 800 includes a title (LANDING PERF), a page number (1/1), and selection buttons 811-826. The selection buttons 811-826 include a thrust reverse setting selection button 811 which presently includes an option for selecting maximum reverse (MREV) or idle reverse (IREV), a landing runway condition selection button 912 which includes an option for selecting a dry runway (DRY) or a wet runway (WET), runway coefficient selection buttons 813 which include options for selecting: GOOD runway (runway coefficient (MU) between 26 and 39 in this example), FAIR runway (runway coefficient (MU) between 11 and 25 in this example), and POOR runway (runway coefficient (MU) between 0 and 10 in this example), a runway coefficient (MU) specification button 814 which allows the pilot to enter a runway coefficient (MU) value (as opposed to a range which can be entered using runway coefficient selection buttons 813, an ORE selection button 815 which presents the ORE page, a rollout distance selection button 816 which allows the pilot to select a page which allows the pilot to enter one or more rollout distance parameters, a MEL selection button 817 which allows the pilot to select a page which allows the pilot to enter one or more MEL parameters, and a delayed braking (DB) selection button 820 which allows the pilot to enter one or more DB parameters. When the pilot selects the rollout distance selection button 816 a rollout distance page (FIG. 7B) is displayed which allows the pilot to specify landing parameters which define rollout distance. If a runway has numerous taxiway exits, then several ORE pages may be used to display them. In some embodiments, only those taxiway exits that have landing performance and/or meet a certain airline determined performance thresholds are displayed.

At this stage the ORE landing performance page 800 includes default values of landing parameters illustrated in dark font. As illustrated in FIG. 7A, the default thrust reverse setting can be Max Reverse (MREV), and the default runway condition (BA) setting can be Dry Runway (DRY). At least some of the selection buttons 811-820 can be used to change the landing parameters. For instance, in this specific, non-limiting implementation, the selection button 811 is used to change a thrust reverse setting from Max Reverse (MREV) to Idle Reverse (IREV) or vice-versa. The selection button 812 is used to change a runway surface condition from Dry Runway (DRY) to Wet Runway (WET) or vice-versa. The selection button 813 is used to change a runaway braking report setting from FAIR (MU=11-25) to either GOOD (MU=26-39) or POOR (MU=0-10). Alternatively, the pilot can use selection button 814 to enter a specific MU value from the scratch pad.

Figure 7B:
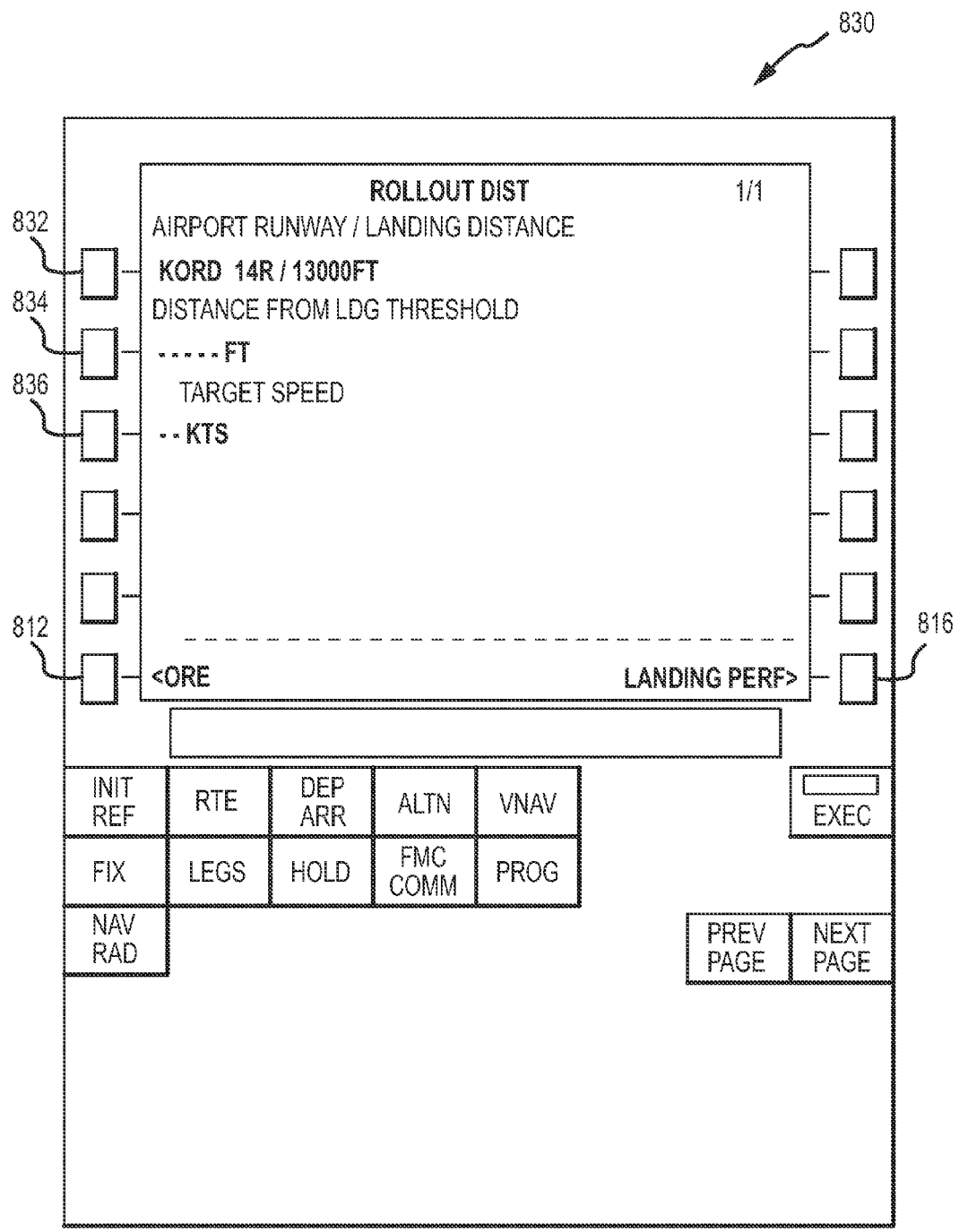
FIG. 7B is a screen shot of an exemplary rollout distance page which is displayed on the FMS user interface when the pilot selects the rollout distance selection button of FIG. 7A in accordance with one exemplary implementation.

Selecting the rollout distance selection button 816 on the landing performance page 800 displays a page 830 (FIG. 7B) which allows the pilot to change parameters associated with the rollout distance to thereby allow the pilot to define any spot on the landing runway as an exit target and a target ground velocity at the defined landing target. FIGS. 7B and 8C are screen shots of a rollout distance specification page 830 in accordance with one embodiment. As will be described below, changing one or more of the rollout distance parameters will modify the predicted landing performance.

Figure 7C:
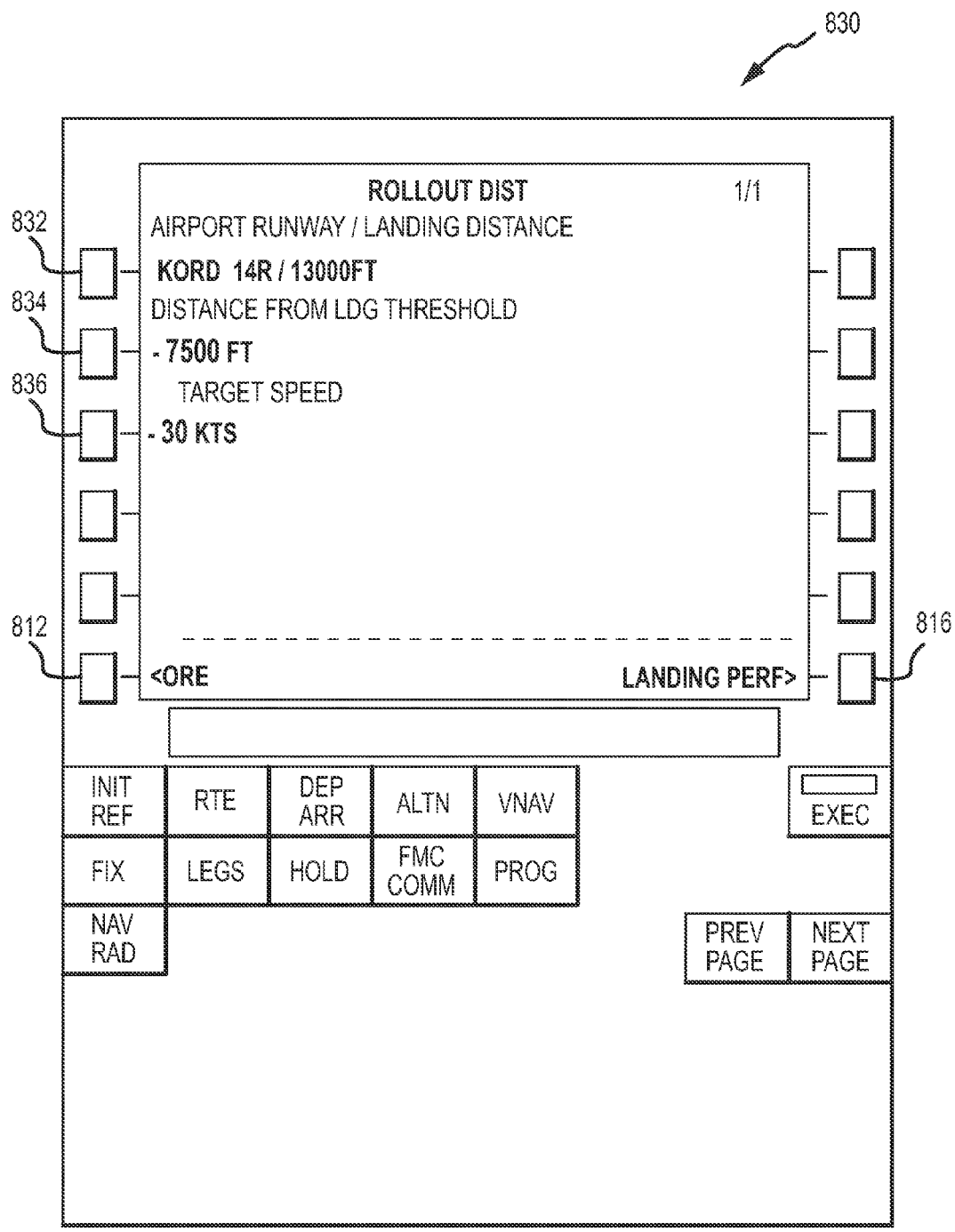
FIG. 7C is a screen shot of the exemplary rollout distance page of FIG. 7B which is displayed on the FMS user interface when the pilot enters information regarding the rollout distance.

FIG. 7B is a screen shot of an exemplary rollout distance page 830 which is displayed on the FMS user interface 164 when the pilot selects the rollout distance selection button 816 of FIG. 7A in accordance with one exemplary implementation. The page 830 includes a title (ROLLOUT DISTANCE), a page number (1/1), and selection buttons 832-836. The selection buttons include: an airport runway/landing distance selection button 832 which presently indicates an airport (KORD), a runway (14R) and a landing distance (13,000 feet); a distance from landing threshold selection button 834 which allows the pilot to enter a distance in feet from the landing threshold; and a target speed selection button 836 which allows the pilot to enter a target speed in knots per second (KTS). FIG. 7C is a screen shot of the exemplary rollout distance page 830 of FIG. 7B which is displayed on the FMS user interface 164 when the pilot enters information regarding the rollout distance using the distance from landing threshold selection button 834 and velocity selection button 836). As illustrated in FIG. 7C, the pilot can enter numeric values in the fields DISTANCE FROM LDG THRESHOLD and TARGET SPEED. In this particular example, the pilot enters 7500 feet in the DISTANCE FROM LDG THRESHOLD field, and a velocity of 30 knots (KTS) in the TARGET SPEED field. Thus, in this particular example, the defined rollout distance is 7500 feet at a speed of 30 knots (KTS).

Figure 7D:
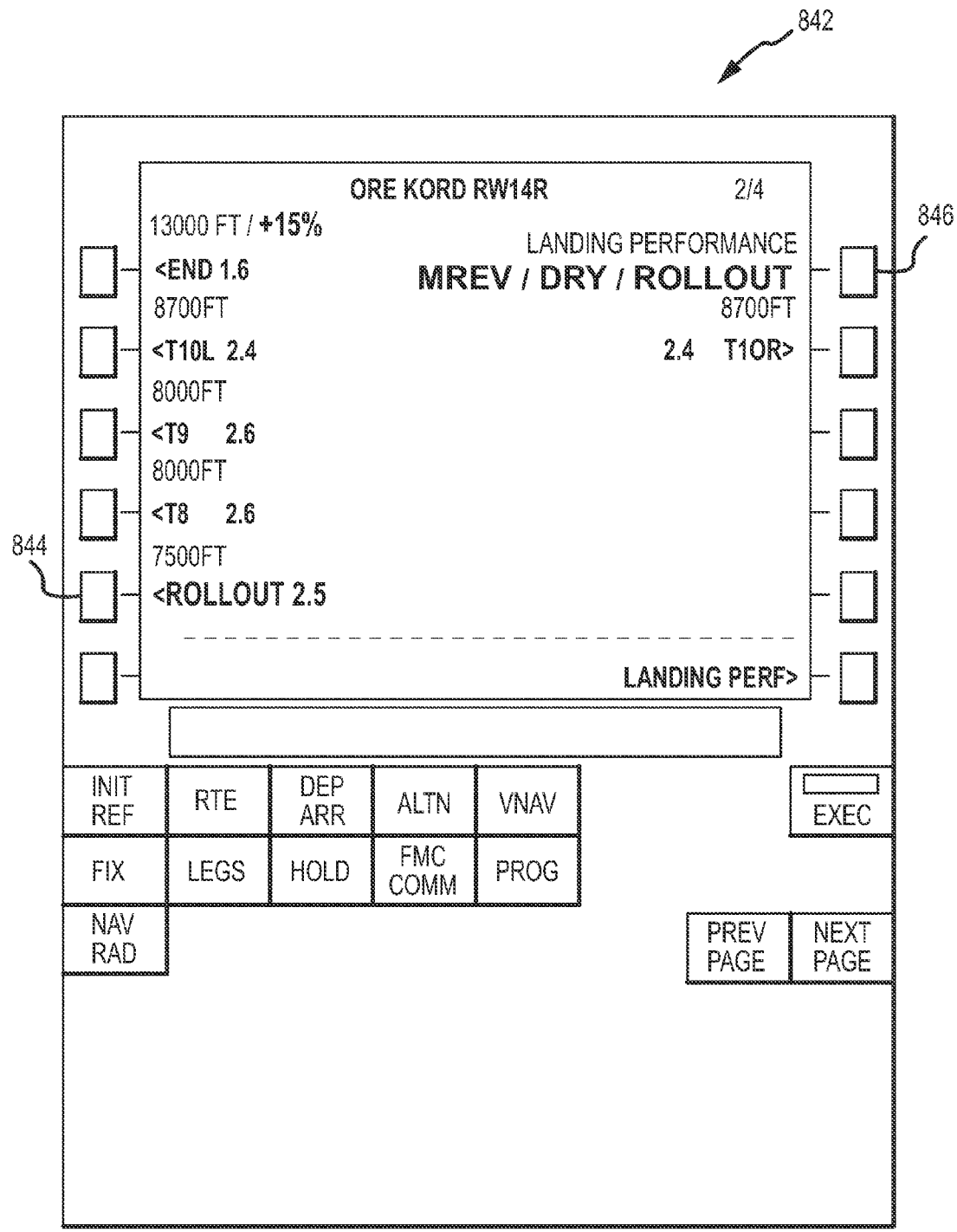
FIG. 7D is a screen shot of an updated version of an exemplary ORE page which is displayed on the FMS user interface after the pilot enters information regarding the rollout distance in accordance with one exemplary implementation.

Next, with reference to FIG. 7D, a scenario is described where the pilot enters changes to a rollout distance via rollout distance button 816 of FIG. 7A. FIG. 7D is a screen shot of an updated version of an exemplary ORE page 842 which is displayed on the FMS user interface 164 after the pilot enters information regarding the rollout distance in accordance with one exemplary implementation. The ORE page 842 includes a title (ORE KORD RW14R), a page number (2/4), and a rollout distance selection button 844 which can be used to select the currently defined "rollout" taxiway exit as the acceptable choice. Current landing performance parameters are displayed next to button 846 which in this example are displayed as a thrust reverse setting of Max Reverse (MREV), a braking action (BA) setting of Dry Runway (DRY), and a rollout (ROLLOUT) setting.

In this example, the pilot defined target (7500 feet) is displayed in sequence according to rollout distance along with other targets. The other selection buttons are defined above. In this example, the rollout distance selection button 844 indicates a distance-to-specific rollout position (7,500 feet in this example) with an AUTOBRAKING value (which is 2.5 in this example) for reaching the pilot defined target (7,500 feet) at the target velocity of 30 knots (KTS) when the AUTOBRAKE selector is in the AUTO position. When either a ROLLOUT definition or LASHO is selected, the field adjacent the selection button 846 displays "ROLLOUT" or "LASHO," and a taxiway named either "ROLLOUT" or "LASHO" will be displayed as the selected taxiway ordered according to landing distance.

Figure 7E:
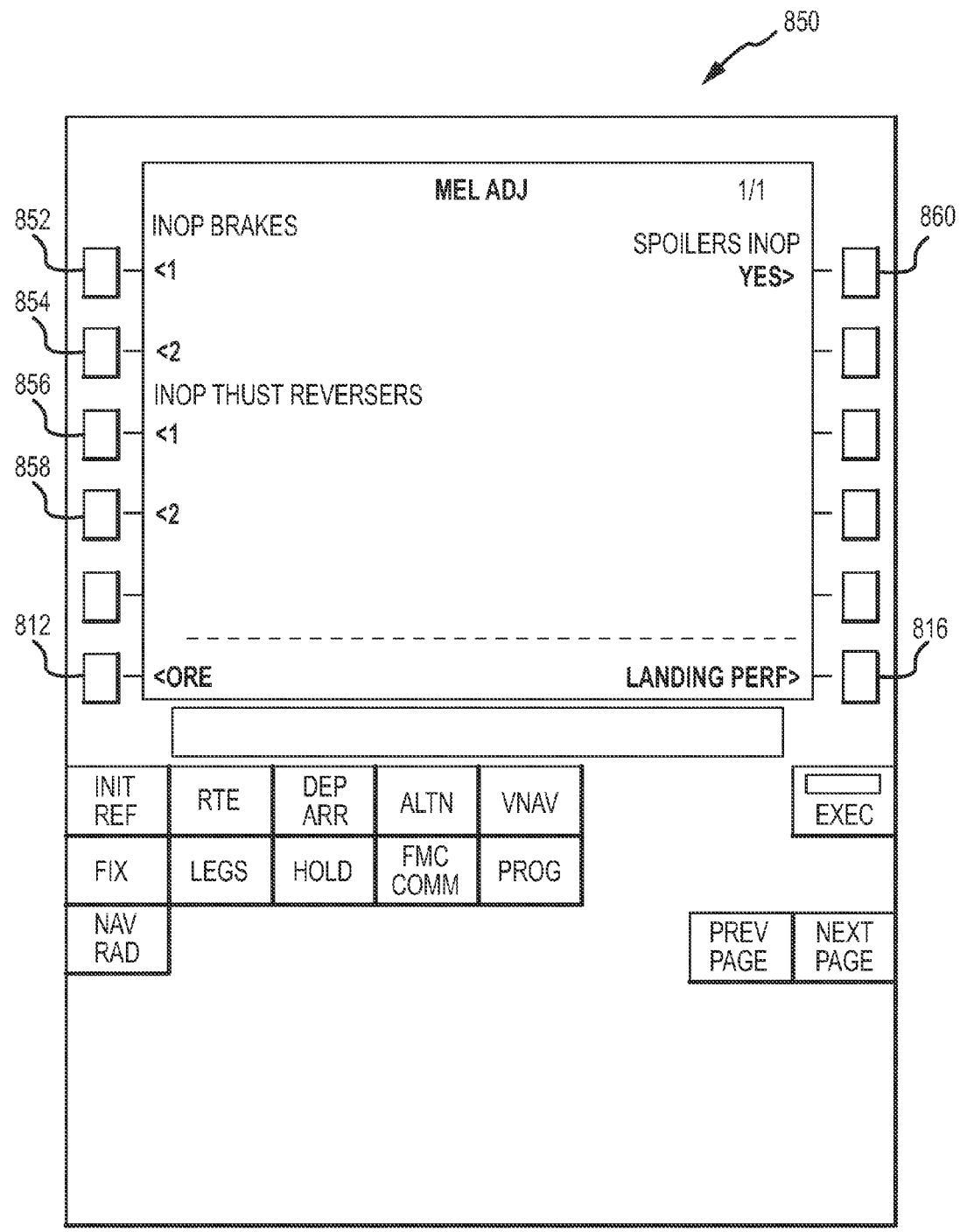
FIG. 7E is a screen shot of an exemplary minimum equipment list (MEL) page which is displayed on the FMS user interface when a pilot enters changes to the MEL in accordance with one exemplary implementation.
Figure 7F:
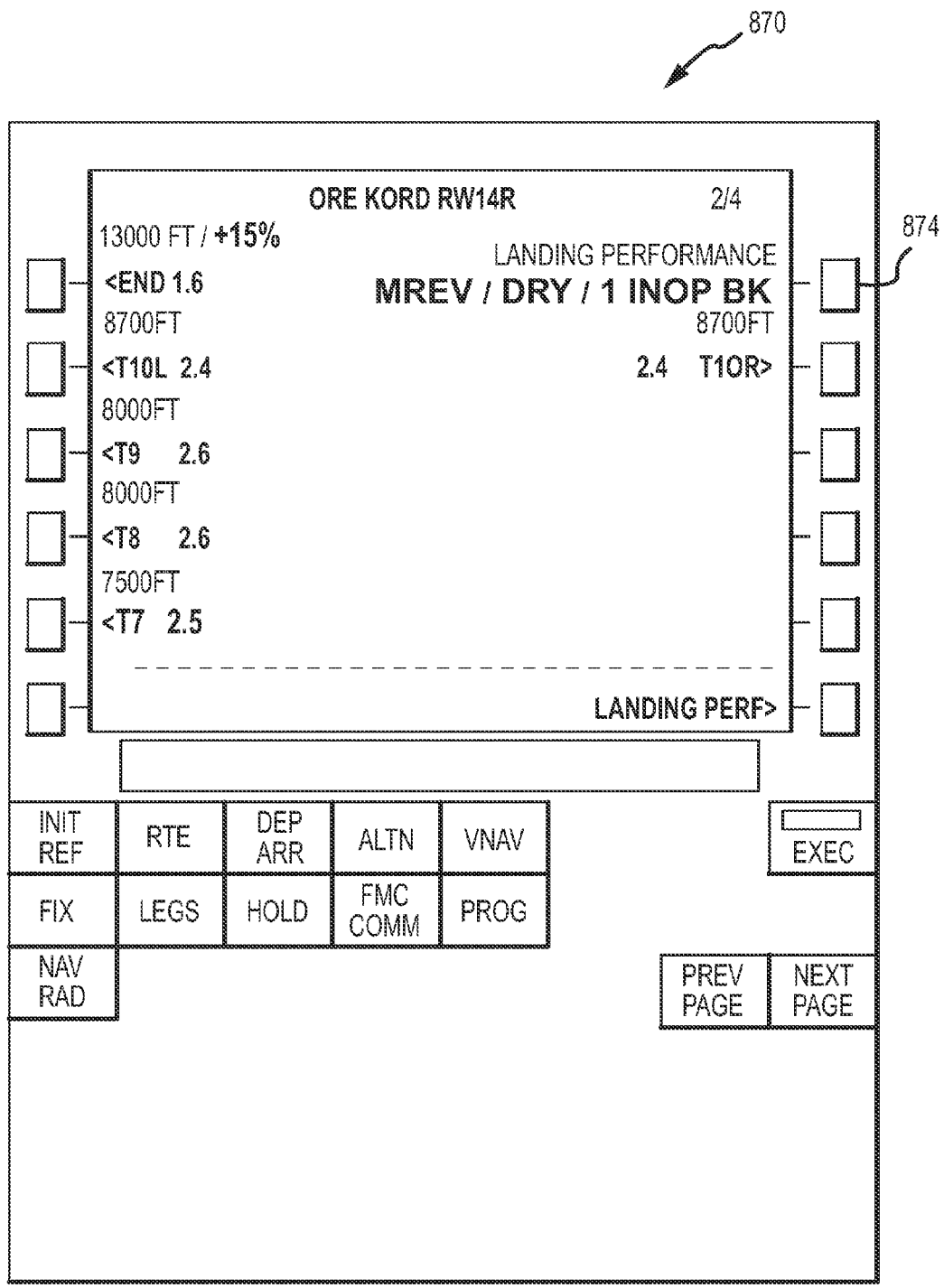
FIG. 7F is a screen shot of an updated version of an exemplary ORE page which is displayed on the FMS user interface after the pilot enters information regarding the MEL adjustments in accordance with one exemplary implementation.

Referring again to FIG. 7A, selecting the minimum equipment list (MEL) adjustment selection button 817 on the landing performance page 800 displays a minimum equipment list (MEL) selection page which allows the pilot to change MEL parameters. FIG. 7E is a screen shot of an exemplary minimum equipment list (MEL) selection page 850 which is displayed on the FMS user interface 164 when a pilot decides to enter changes to the MEL in accordance with one exemplary implementation. The MEL selection page 850 includes a title (MEL ADJ), a page number (1/1), various MEL parameters, and selection buttons 852-860 for adjusting the MEL parameters which effect landing performance. In this particular implementation, it is assumed that the MEL parameters are brakes, thrust reversers and spoilers; however, additional MEL parameters can also be included depending on the implementation. Changing one or more of the MEL parameters will modify the predicted landing performance. The default landing parameters specify that the brakes, thrust reversers, and spoilers are operable. The selection buttons 852-860 include: brake status selection buttons 852, 854 which can allow the pilot to specify the inoperability of the brakes by selecting <1 and/or <2 to specify inoperability of one or more brakes, thrust reverser status selection buttons 856, 858 which can allow the pilot to specify the inoperability of the thrust reversers by selecting <1 and/or <2 to specify inoperability of one or more thrust reversers, and a spoiler selection button 860 which can be used to select/toggle whether the spoilers are operable. The pilot can select/adjust any of these options via corresponding selection buttons. For example, if the pilot chooses to specify that a brake is inoperable, then the pilot can specify the inoperability of a brake by selecting <1. FIG. 7F is a screen shot of an updated version of an exemplary ORE page 870 which is displayed on the FMS user interface 164 after the pilot enters information regarding the MEL adjustments in accordance with one exemplary implementation. The item next to button 874 now displays the landing parameters (which included maximum reverse (MREV), dry runway (DRY)) and which reflect the MEL landing performance adjustments which in this example includes one inoperable brake (1 INOP BK).

Referring again to FIG. 7A, selecting the delayed braking selection button 820 on the landing performance page 800 allows the pilot to activate or deactivate delayed braking (DB). Delayed braking is available only on DRY runways. Delayed braking can be activated or deactivated by the pilot and refers to allowing the aircraft to coast until a Airline Policy File defined minimum braking deceleration is reached. Coasting is allowed, for example, on long runways with headwinds when the exit taxiway is near the runway end. This avoids the need to add power to reach the exit after braking. Delayed braking is determined based upon a minimum value for constant braking defined in the airline policy file (APF), and can use either MAX REV or IDLE REV.

Figure 7G:
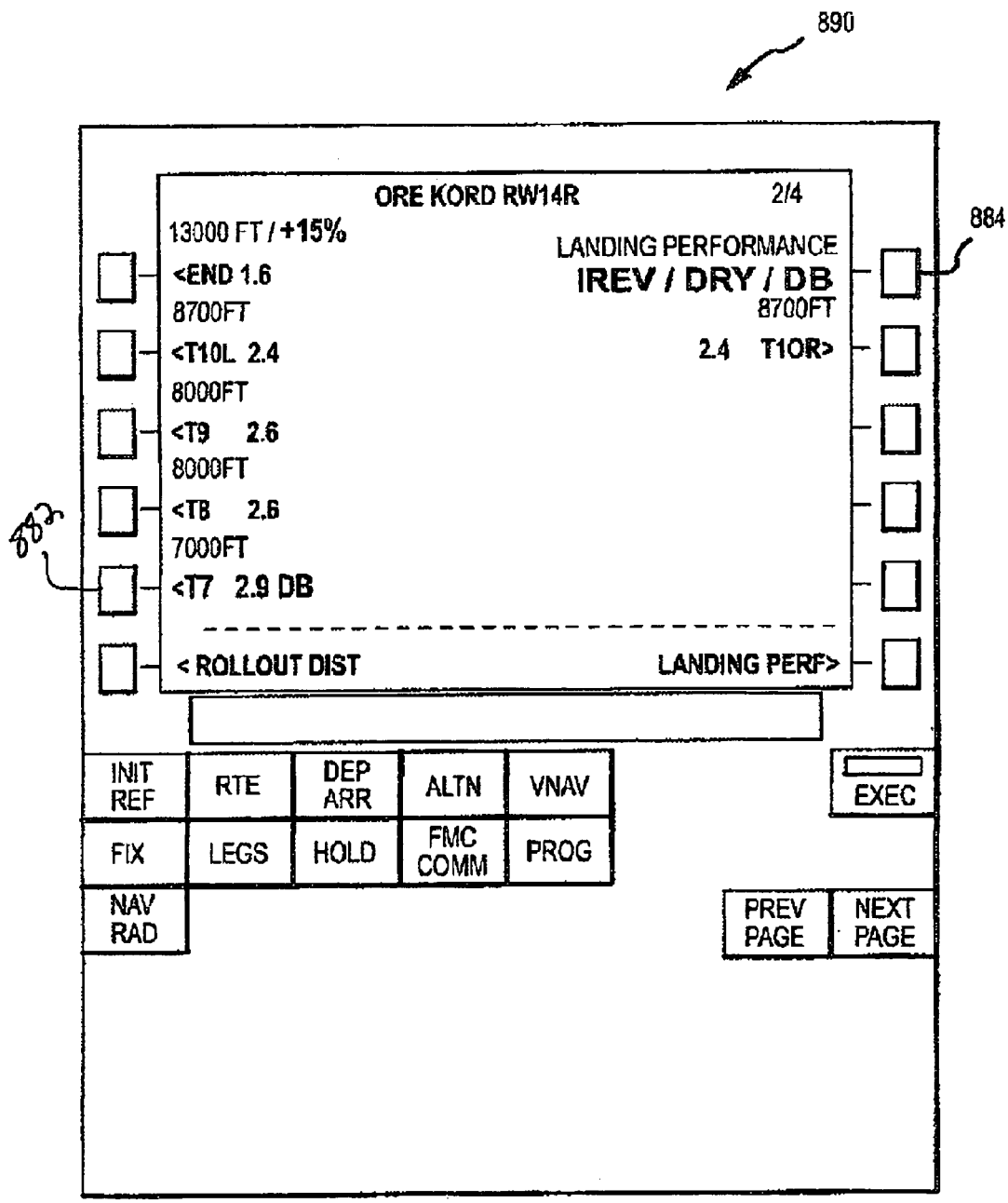
FIG. 7G is a screen shot of an updated version of an exemplary ORE page which is displayed on the FMS user interface after the pilot enters information regarding delayed braking in accordance with one exemplary implementation.

FIG. 7G is a screen shot of an updated version of an exemplary ORE page 890 which is displayed on the FMS user interface 164 after the pilot enters information regarding the changes to a minimum equipment list (MEL) in accordance with one exemplary implementation. The AUTOBRAKE value (2.9) is displayed next to button 882 and includes the acronym "DB" to indicate that a Delayed Braking calculation has been applied. Landing performance details are displayed next to button 884 and in this example the landing performance details include the acronym "DB" to indicate that a Delayed Braking calculation has been applied. When delayed braking is activated, a Braking Activation Target (BAT) is displayed on the airport map as will be described below with reference to FIG. 9. Prior to landing, delayed braking is computed based on predicted landing performance, whereas after landing, delayed braking is computed based on actual landing performance.

Figure 7H:
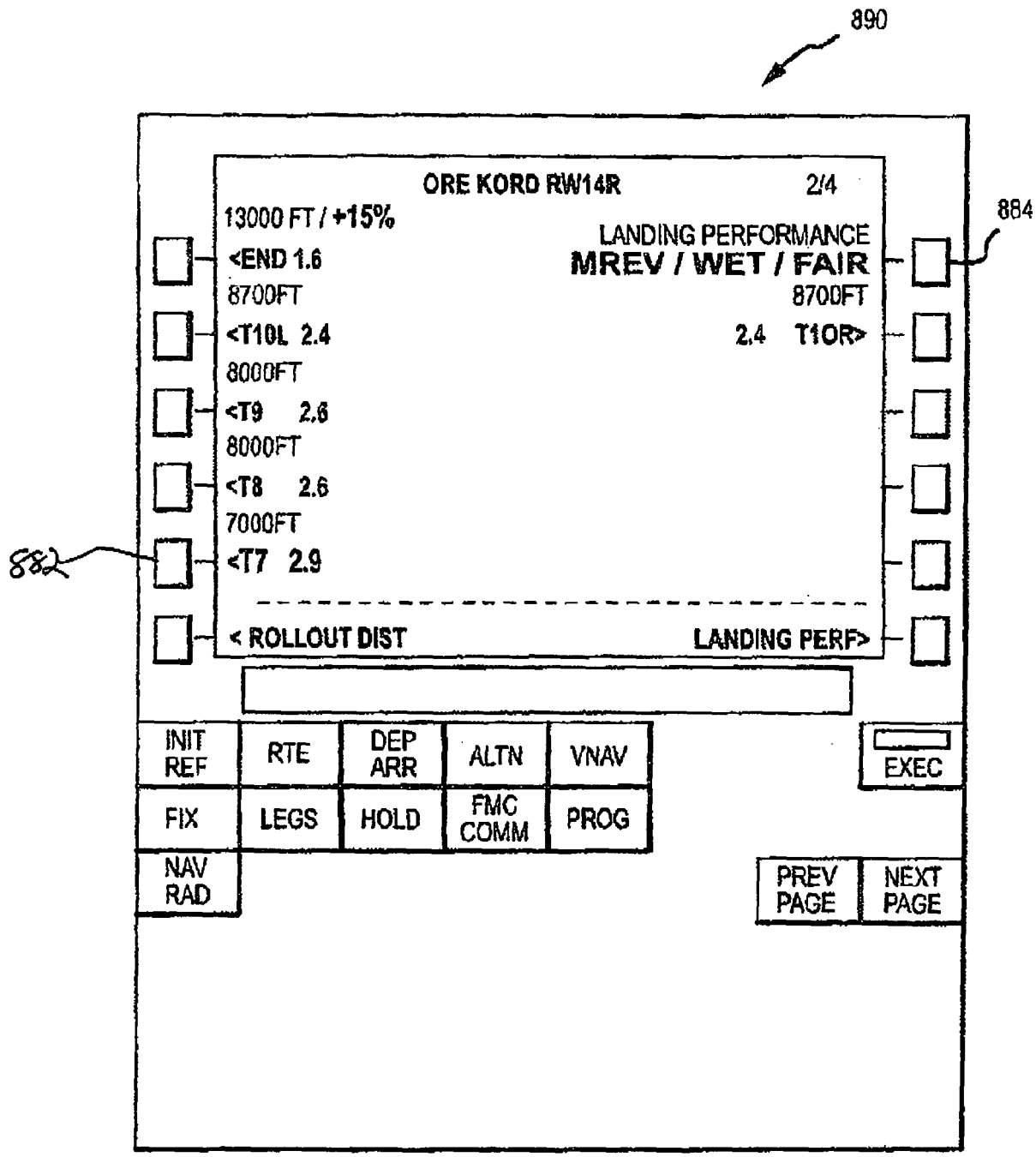
FIG. 7H is a screen shot of an updated version of an exemplary ORE page which is displayed on the FMS user interface after the pilot enters information regarding the changes to landing runway conditions, and runway braking action reports in accordance with one exemplary implementation.

FIG. 7H is a screen shot of an updated version of an exemplary ORE page 890 which is displayed on the FMS user interface 164 after the pilot enters information regarding the changes to a thrust reverse setting, a landing runway condition, a runway braking action reports and delayed braking in accordance with one exemplary implementation. The current landing performance parameters are displayed next to button 884 which now include: a thrust reverse setting of Max Reverse (MREV), a braking action (BA) setting of Wet Runway (WET), and a FAIR runway (FAIR) to indicate landing performance has be calculated for braking action reports of "FAIR" (e.g., a runway having a runway coefficient (MU) between 11 and 25 in this example). In this example, the rollout selection button 882 indicates a distance-to-specific rollout position (7,000 feet in this example at taxiway exit T7) at necessary AUTOBRAKING value which is 2.9.

Exemplary Runway Maps Displayed on the MFD User Interface

Screen shots of example runway maps which can be displayed on the MFD user interface 166 during various stages of flight and landing will now be described with reference to FIGS. 8A through 10B.

Exemplary Runway Maps Displayed During Default and Updated Modes

Figure 8A:
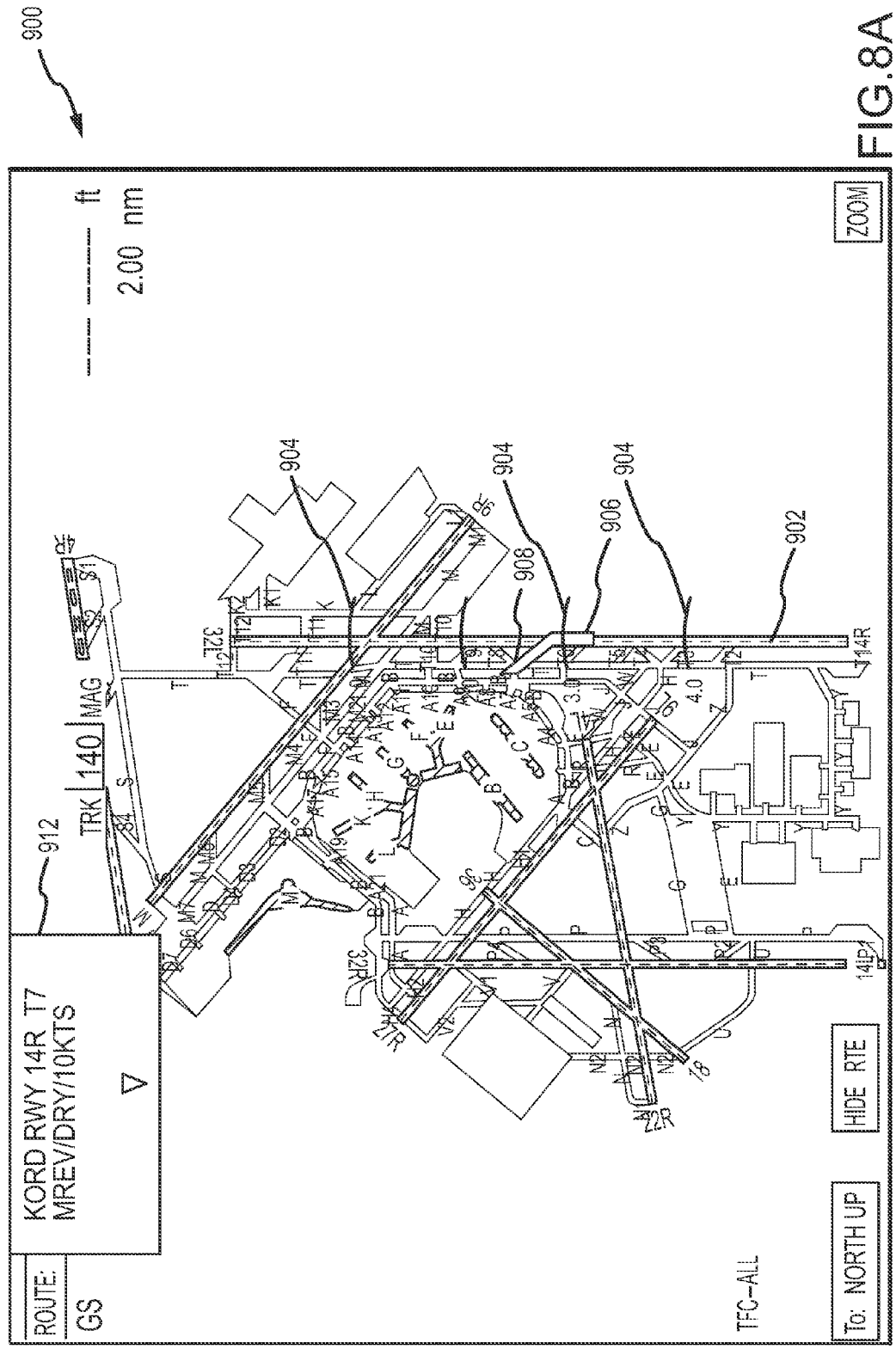
FIG. 8A is a screen shot of an exemplary runway map which is displayed on the MFD user interface during default mode or updated mode in accordance with one exemplary implementation.
Figure 8B:
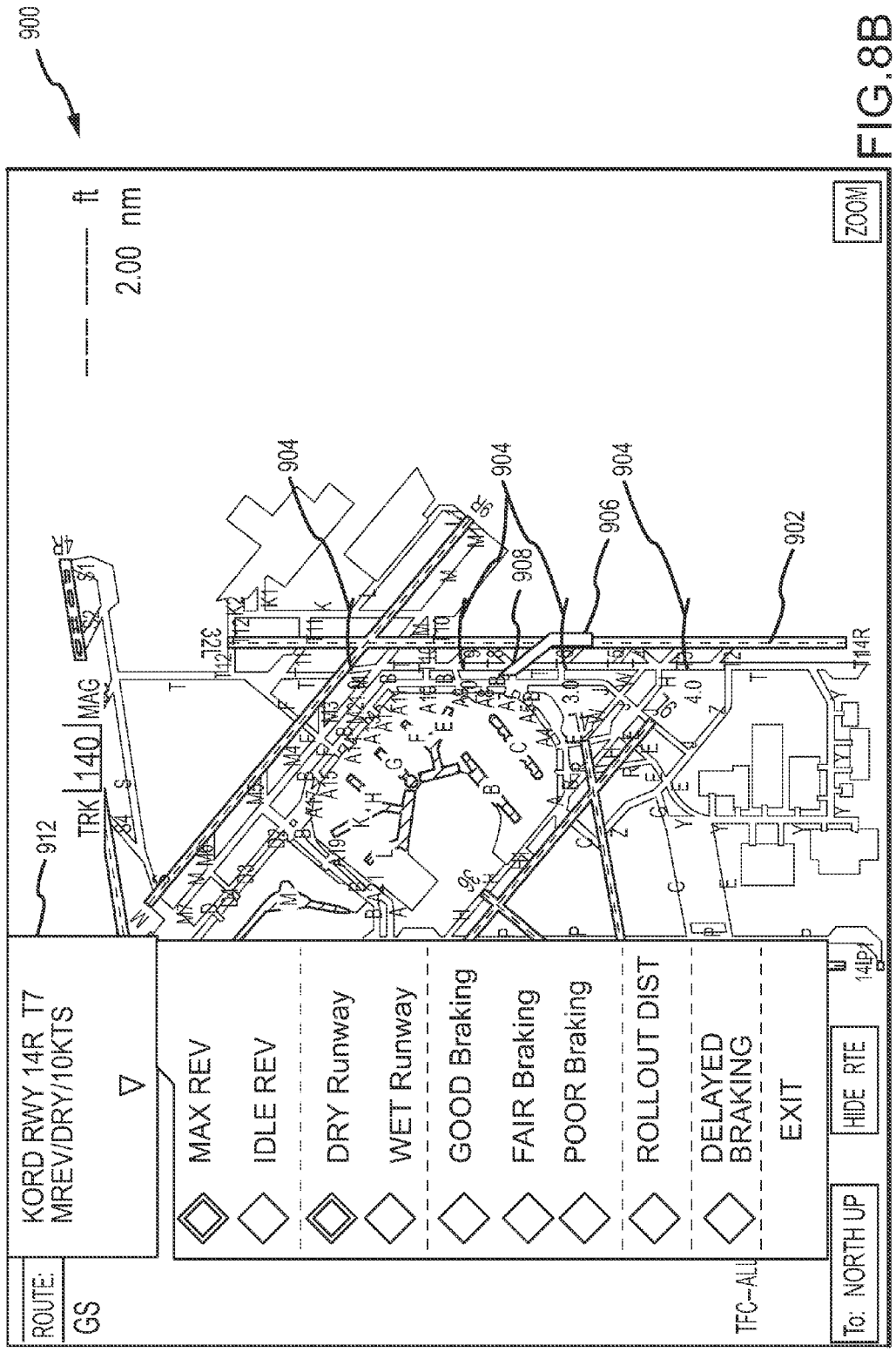
FIG. 8B is a screen shot of an updated version of the runway map of FIG. 8A during default/current mode when the pilot opens a menu which displays control buttons for changing one or more of the default/current landing parameters in accordance with one exemplary implementation.

FIG. 8A is a screen shot of an exemplary runway map 900 which is displayed on the MFD user interface 166 during default mode or updated mode while the aircraft is airborne in accordance with one exemplary implementation. The runway map 900 includes a default/current runway 902 that is marked with indicia of predicted default/current landing performance for default/current landing parameters. The default/current runway 902 includes four landing performance indicators (LPIs) 904 each including a corresponding autobrake setting (1.0, 2.0, 3.0, 4.0), a Runway Exit Target (RET) 906 representing an exit target on the default/current runway 902, a Runway Exit Indicator (REI) 908 representing an exit on the default/current runway 902, and a menu 912 which displays default/current landing parameters including default/current airport (KORD), default/current runway (RWY 14R), default/current taxiway (T7), a default/current thrust reverse setting which is maximum reverse (MREV) in this example, a default/current runway condition (DRY) and a default/current specified velocity of 10 knots (KTS) at the specified position. FIG. 8B is a screen shot of an updated version of the runway map 900 of FIG. 8A during default/current mode when the pilot opens a menu 912 which displays control buttons for changing one or more of the default/current landing parameters in accordance with one exemplary implementation.

Exemplary Runway Map Displayed During Set Mode

Figure 9:
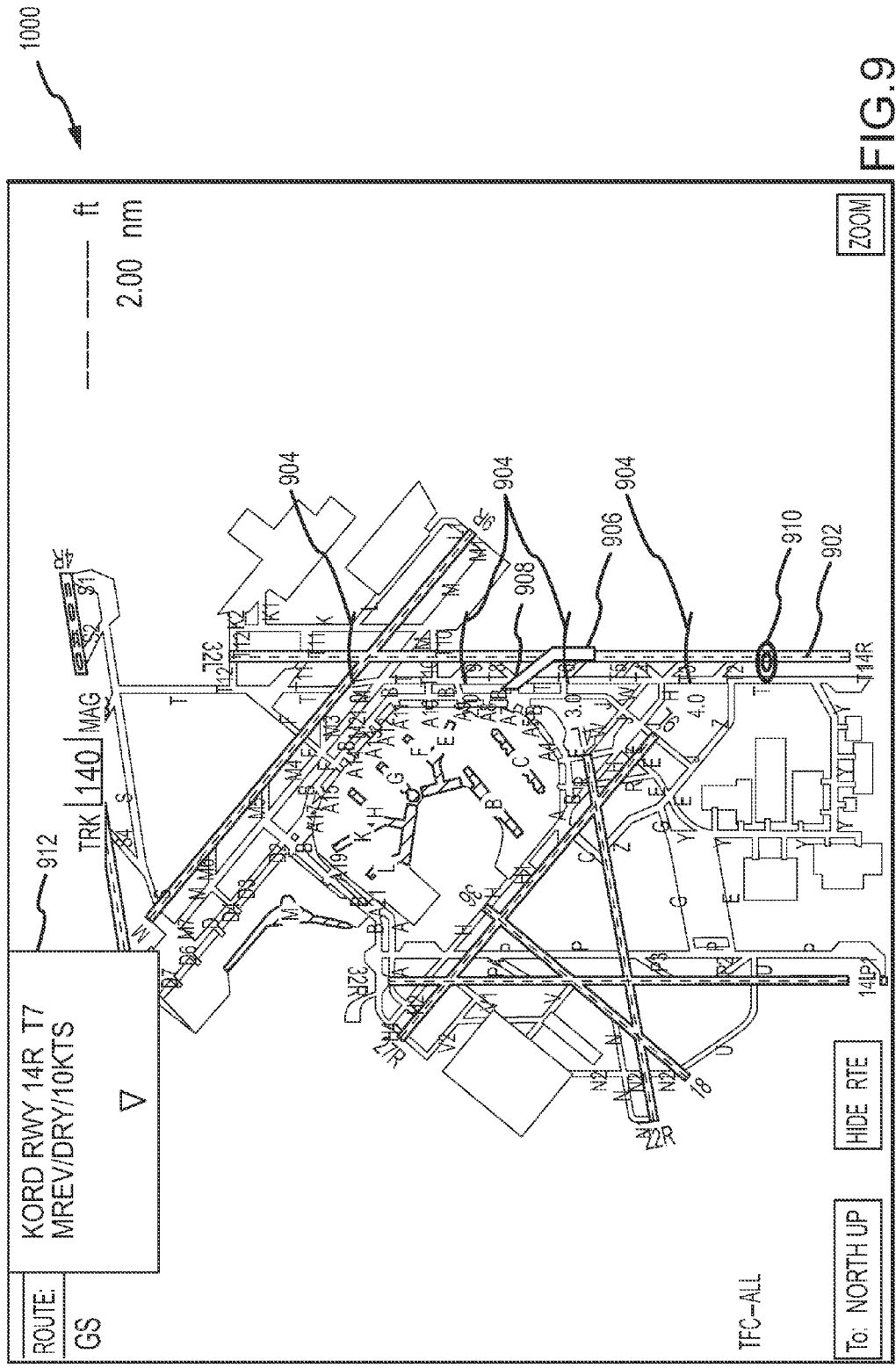
FIG. 9 is a screen shot of an exemplary runway map which is displayed on the MFD user interface during set mode when the aircraft is airborne before landing in accordance with one exemplary implementation.

FIG. 9 is a screen shot of an exemplary runway map 1000 which is displayed on the MFD user interface 166 during set mode in accordance with one exemplary implementation. In this example, it is assumed that the pilot is satisfied with the default or current landing parameters and has accepted them by placing the autobrake switch in a selected position. In addition to the indicia of predicted landing performance described above with reference to FIG. 8A, the runway map 1000 also includes a Brake Activation Target (BAT) 910 which indicates to the pilots when the ORE system will apply the brakes when delayed braking is used. This is useful in low visibility situations when the pilots cannot see the entire runway.

Exemplary Runway Maps Displayed During Landing Mode

Figure 10A:
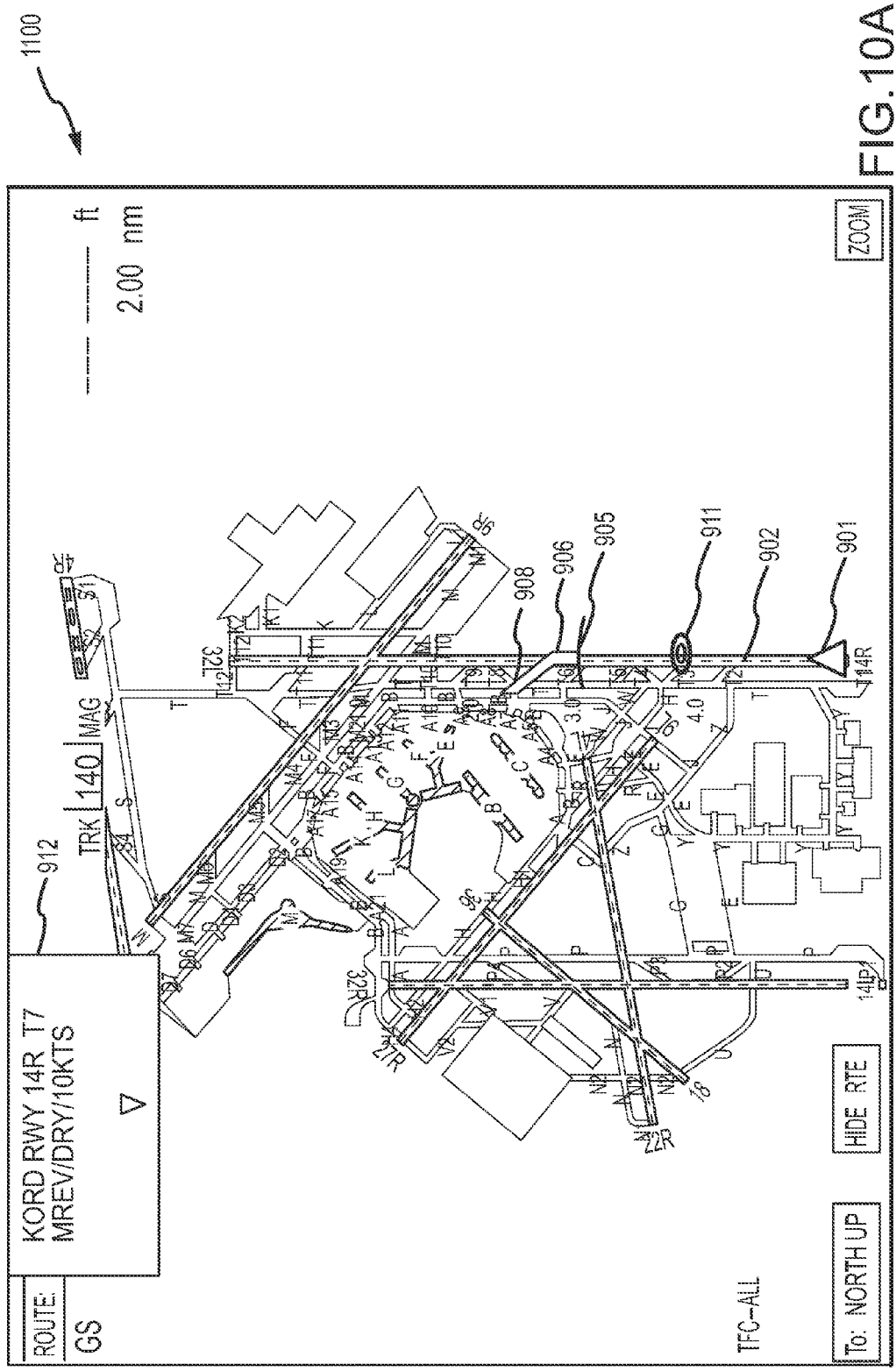
FIG. 10A is a screen shot of an exemplary runway map which is displayed on the MFD user interface during landing mode after the aircraft lands in accordance with one exemplary implementation.
Figure 10B:
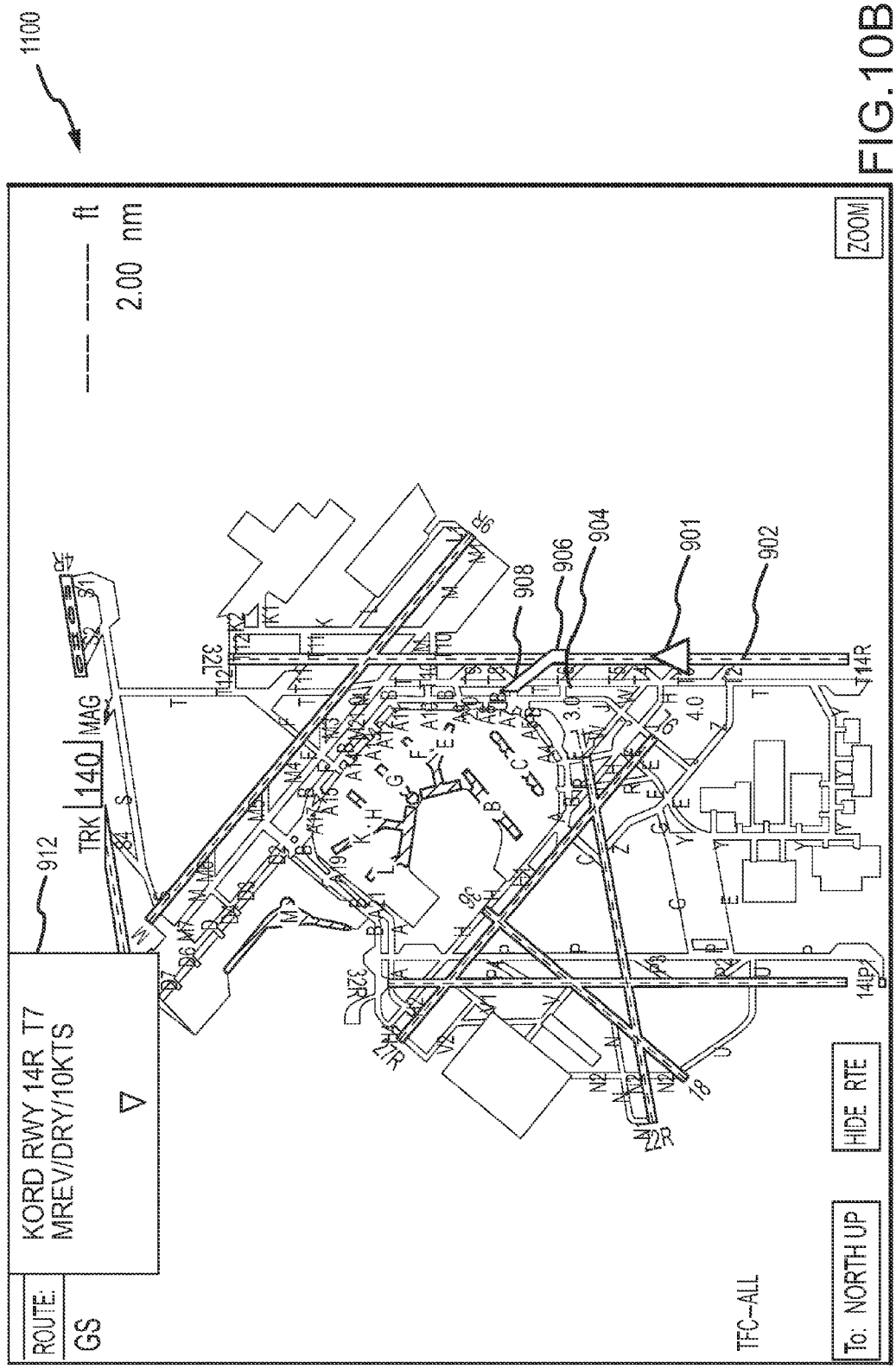
FIG. 10B is a screen shot of the exemplary runway map of FIG. 10A as the aircraft proceeds along the runway.

FIG. 10A is a screen shot of an exemplary runway map 1100 which is displayed on the MFD user interface 166 during landing mode after the aircraft lands in accordance with one exemplary implementation. The runway map 1100 that is displayed during landing mode is similar to the one that is display in set mode (FIG. 9) except that the BAT 911 changes color to indicate that the aircraft has landed, and a triangular-shaped symbol 901 is provided representing the position of the aircraft on the runway (14R) 902. In addition, a dynamic landing performance indicator (LPI) 905 is displayed. The landing performance indicator 905 displays the position on the airport map where the airplane will be when it is at the target speed. During operation of the ORE the LPI arc will be positioned over the RET. FIG. 10B is a screen shot of the exemplary runway map 1100 of FIG. 10A as the aircraft (represented by the triangular-shaped symbol 901) proceeds along the runway 902. In FIG. 10B, when the aircraft reaches the BAT the AUTOBRAKES are applied and the BAT (no longer shown in FIG. 10B) is removed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method, comprising:
    inputting manually, prior to landing, at least one new landing parameter to generate current landing parameters comprising the at least one new landing parameter and default landing parameters, said at least one new landing parameter including a selected position on a particular runway and a specified velocity at said selected position, said selected position and specified velocity selectable independent of one another;
    determining updated predicted landing performance based on the current landing parameters and aircraft performance parameters prior to landing, said determining comprising a computer executing programmed instructions residing in memory; and
    displaying an updated airport map which displays a currently selected runway with updated indicia of updated predicted landing performance for at least one exit taxiway of the currently selected runway, wherein the updated indicia of updated predicted landing performance include a recommended setting for an automatic braking system that will provide dynamic braking to slow an aircraft to said selected velocity at said selected position on the currently selected runway, manually selecting said setting.

2. A method according to claim 1, further comprising the steps of:
    displaying default landing parameters and aircraft performance parameters; and
    displaying an airport map with a default runway having a number of exit taxiways and indicia of predicted landing performance for at least one exit taxiway displayed on the default runway, wherein the indicia of predicted landing performance are determined based on the default landing parameters and the aircraft performance parameters.

3. A method according to claim 2, wherein the indicia of predicted landing performance displayed on the airport map comprise: a Landing Performance Indicator (LPI).

4. A method according to claim 3, wherein the indicia of predicted landing performance displayed on the airport map further comprise:
    a Runway Exit Indicator (REI) comprising a particular taxiway exit located on a particular landing runway, and
    a Runway Exit Target (RET) comprising a particular runway target position on the particular landing runway.

5. A method according to claim 4, wherein the updated indicia of predicted landing performance displayed on the updated airport map comprise at least one of:
    said updated Runway Exit Indicator (REI), said updated Runway Exit Target (RET), an updated Brake Activation Target (BAT) and an updated Landing Performance Indicator (LPI).

6. A method according to claim 1, further comprising:
    setting the automatic braking system to provide dynamic braking to slow the aircraft to the selected velocity at the selected position on the currently selected runway if there are no further changes to the current landing parameters and default landing parameters.

7. A method according to claim 1, further comprising the step of:
    using an automatic braking system to automatically control the brake activation system of the aircraft to slow the landing aircraft to said selected velocity greater than or equal to zero at said selected position on the particular runway, wherein the selected position is one of:
    a particular taxiway exit located on the particular landing runway; and
    a particular runway target position on the particular landing runway.

8. A method according to claim 1, wherein the at least one new landing parameter comprises at least one of:
    an updated landing condition variable, an updated landing variable and an updated minimum equipment list (MEL) item, and wherein the aircraft performance parameters comprise at least one of:
    aircraft weight, aircraft configuration, and aircraft generated performance measurements.

9. A method according to claim 8, wherein the updated landing condition variable comprises at least one of:
    an updated runway surface condition of the particular runway; and
    an updated braking action report.

10. A method according to claim 8, wherein the updated landing variables comprise at least one of:
    an updated value of the selected velocity;
    an updated reverse thrust adjustment value;
    an updated value for the selected position;
    a delayed braking setting adjustment; and
    a Land and Hold Short (LAHSO) setting adjustment.

11. A method according to claim 7, wherein the step of using an automatic braking system to automatically control the brake activation system of the aircraft to slow the landing aircraft to a selected velocity at a selected position on a particular runway comprises the steps of:
    determining, upon landing the aircraft, a deceleration rate required for slowing the aircraft to reach the selected velocity at the selected position based on a current position of the aircraft and a current ground velocity of the aircraft;
    controlling deceleration of the aircraft via the automatic braking system based on the deceleration rate so that the aircraft will reach the selected velocity at the selected position; and further comprising the step of:
displaying indicia of actual landing performance with respect to the selected position as the aircraft approaches the selected position, wherein the indicia of actual landing performance are determined based on a current ground velocity of the aircraft and the current deceleration rate, and wherein indicia of the actual landing performance comprise a static Runway Exit Indicator (REI) comprising a particular taxiway exit located on the particular landing runway, a static Runway Exit Target (RET) comprising a particular runway target position located on the particular landing runway, a static Brake Activation Target (BAT) and at least one dynamic Landing Performance Indicator (LPI).

12. A system, comprising:
an input device in communication with a programmed computer comprising programmed instructions residing in memory, said input device designed to receive manual input, said input comprising at least one new landing parameter prior to landing, said at least one new landing parameter including a selected position on a particular runway and a specified velocity at said selected position, said selected position and specified velocity selectable independent of one another;
said computer programmed to update current landing parameters each time a landing parameter is changed, and to determine updated predicted landing performance based on the current landing parameters and aircraft performance parameters including prior to landing, said computer executing programmed instructions residing in memory; and
at least one display unit designed to display an updated airport map which displays a currently selected runway and updated indicia of updated predicted landing performance for at least one exit taxiway displayed on the currently selected runway;
wherein the updated indicia of updated predicted landing performance include a recommended setting for an automatic braking system that will provide dynamic braking to slow an aircraft to a selected velocity at a selected position on the currently selected runway, manually selecting said setting.

13. A system according to claim 12, wherein:
the display unit is designed to display default landing parameters and the aircraft performance parameters;
the computer is programmed to determine predicted landing performance, wherein the predicted landing performance is determined based on the default landing parameters and the aircraft performance parameters; and
the at least one display unit is designed to display an airport map with a default runway having a number of exit taxiways and indicia of the predicted landing performance.

14. A system according to claim 13, wherein the indicia of predicted landing performance displayed on the airport map comprise at least one of: a Runway Exit Indicator (REI) comprising a particular taxiway exit located on the particular landing runway, a Runway Exit Target (RET) comprising a particular runway target position located on the particular landing runway, and a Landing Performance Indicator (LPI).

15. A system according to claim 12, wherein the updated indicia of predicted landing performance displayed on the updated airport map comprise at least one of:
an updated Runway Exit Indicator (REI) comprising a particular taxiway exit located on the particular landing runway, an updated Runway Exit Target (RET) comprising a particular runway target position located on the particular landing runway, an updated Brake Activation Target (BAT) and an updated Landing Performance Indicator (LPI).

16. A system according to claim 12, wherein the at least one new landing parameter comprises at least one of:
an updated landing condition variable, an updated landing variable and an updated minimum equipment list (MEL) item, and
wherein the aircraft performance parameters comprise at least one of: aircraft weight, aircraft configuration, and aircraft generated performance measurements.

17. A system according to claim 16, wherein the updated landing condition variable comprises at least one of:
an updated runway surface condition of the particular runway;
an updated braking action report.

18. A system according to claim 16, wherein the updated landing variables comprise at least one of:
an updated value of the selected velocity;
an updated reverse thrust adjustment value;
an updated value for the selected position;
a delayed braking setting adjustment; and
a Land and Hold Short (LAHSO) setting adjustment.

19. A system according to claim 12, wherein the automatic braking system automatically controls a brake activation system of the aircraft to slow the aircraft to a selected velocity greater than or equal to zero at a selected position on a particular runway, wherein the selected position is one of:
a particular taxiway exit located on the particular landing runway; and
a particular runway target position on the particular landing runway.

20. A system according to claim 19, wherein the computer is further programmed to determine, upon landing the aircraft, a deceleration rate required for slowing the aircraft to reach the selected velocity at the selected position based on a current position of the aircraft and a current ground velocity of the aircraft, and to control deceleration of the aircraft via the automatic braking system based on the deceleration rate so that the aircraft will reach the selected velocity at the selected position.

21. A system according to claim 20, wherein the display is further designed to display indicia of actual landing performance with respect to the selected position as the aircraft approaches the selected position, wherein the indicia of actual landing performance are determined based on a current ground velocity of the aircraft and the current deceleration rate, and wherein indicia of the actual landing performance comprise a static Runway Exit Indicator (REI) comprising a particular taxiway exit located on the particular landing runway, a static Runway Exit Target (RET) comprising a particular runway target position located on the particular landing runway, a static Brake Activation Target (BAT) and at least one Landing Performance Indicator (LPI).

22. In a computer system having a graphical user interface including at least one display and an input device, a method comprising the steps of:
displaying, on the display, default landing parameters and aircraft performance parameters;
displaying, on the display, an airport map with a default runway having a number of exit taxiways and predicted landing performance of the aircraft, wherein the predicted landing performance is determined based on the default landing parameters and the aircraft performance parameters, wherein the airport map displays a Runway Exit Indicator (REI) comprising a particular taxiway exit located on the particular landing runway, Runway Exit Target (RET) comprising a particular runway target position located on the particular landing runway, and a Landing Performance Indicator (LPI);

inputting manually, prior to landing, at least one new landing parameter to generate current landing parameters comprising the at least one new landing parameter and default landing parameters, said at least one new landing parameter including a selected position on a particular runway and a specified velocity at said selected position said selected position and specified velocity selectable independent of one another;

displaying, on the display, an updated airport map with the default runway and updated predicted landing performance including prior to landing, wherein the updated airport map displays an updated Runway Exit Indicator (REI), an updated Runway Exit Target (RET), and an updated Landing Performance Indicator (LPI).

23. A method according to claim 22, further comprising the step of:

displaying, on the display, another airport map with indicia of actual landing performance with respect to the selected position as an aircraft approaches the selected position, wherein indicia of the actual landing performance are based on a current ground velocity of the aircraft and a current deceleration rate, wherein indicia of the actual landing performance comprise at least one of:

a symbol representing an updated predicted touchdown position of the aircraft, an updated Runway Exit Indicator (REI), an updated Runway Exit Target (RET), an updated Brake Activation Target (BAT) and an updated dynamic Landing Performance Indicator (LPI).

24. In a computer system having a graphical user interface including at least one display, a method for assisting a pilot in preparing to land an aircraft, the method comprising the steps of:

inputting manually, prior to landing, at least one new landing parameter to generate current landing parameters comprising the at least one new landing parameter and default landing parameters, said at least one new landing parameter including a selected position on a particular runway and a specified velocity at said selected position, said selected position and specified velocity selectable independent of one another;

displaying, on the display, an airport map with a default runway and indicia of predicted landing performance for at least one exit taxiway displayed on the default runway including prior to landing, wherein the indicia of predicted landing performance are determined based on said current landing parameters and aircraft performance parameters.

* * * * *